(12) United States Patent
Dobosz et al.

(10) Patent No.: US 12,031,891 B2
(45) Date of Patent: Jul. 9, 2024

(54) TISSUE SAMPLE PREPARATION SYSTEM

(71) Applicant: HOFFMANN-LA ROCHE INC., Little Falls, NJ (US)

(72) Inventors: Michael Dobosz, Penzberg (DE); Joerg Mueller, Penzberg (DE); Thomas Poeschinger, Penzberg (DE)

(73) Assignee: HOFFMAN-LA ROCHE, INC., Little Falls, NJ (US)

( * ) Notice: Subject to any disclaimer, the term of this patent is extended or adjusted under 35 U.S.C. 154(b) by 352 days.

(21) Appl. No.: 16/955,337

(22) PCT Filed: Dec. 20, 2018

(86) PCT No.: PCT/EP2018/086223
§ 371 (c)(1),
(2) Date: Jun. 18, 2020

(87) PCT Pub. No.: WO2019/129646
PCT Pub. Date: Jul. 4, 2019

(65) Prior Publication Data
US 2021/0018408 A1 Jan. 21, 2021

(30) Foreign Application Priority Data
Dec. 29, 2017 (EP) .................................. 17211233

(51) Int. Cl.
*G01N 1/31* (2006.01)
*G01N 1/34* (2006.01)
*G01N 1/44* (2006.01)

(52) U.S. Cl.
CPC .............. *G01N 1/31* (2013.01); *G01N 1/34* (2013.01); *G01N 1/44* (2013.01)

(58) Field of Classification Search
CPC .............. G01N 1/31; G01N 1/34; G01N 1/44
(Continued)

(56) References Cited

U.S. PATENT DOCUMENTS 5,834,196 A 11/1998 Reutelingsperger
10,591,392 B2 * 3/2020 Torres ................ G01N 33/4833
(Continued)

FOREIGN PATENT DOCUMENTS

CN 101778673 A 7/2010
CN 104048862 A 9/2014
(Continued)

OTHER PUBLICATIONS

Notice of Reasons for Rejection dated Jul. 7, 2021 issued in corresponding Japanese patent application No. 2020-534899.
(Continued)

*Primary Examiner* — Alexander A Mercado
*Assistant Examiner* — Rodney T Frank
(74) *Attorney, Agent, or Firm* — Harness, Dickey & Pierce, P.L.C.

(57) ABSTRACT

The method includes fixing the tissue sample with a first fixation solution immersing the tissue sample in a delipidation solution including a chaotropic agent configured to induce a swelling of the sample; staining the tissue sample; dehydrating the tissue sample in an organic dehydration solution, the dehydration solution configured to induce a shrinking of the sample; and immersing the fixed tissue sample in an organic clearing solution.

20 Claims, 10 Drawing Sheets

(58) Field of Classification Search
USPC .................................................... 435/40.5
See application file for complete search history.

(56) References Cited

U.S. PATENT DOCUMENTS

| | | |
|---|---|---|
| 2001/0051365 A1 | 12/2001 | Morales et al. |
| 2004/0048384 A1 | 3/2004 | Augello et al. |
| 2005/0090017 A1 | 4/2005 | Morales |
| 2005/0269315 A1 | 12/2005 | Visinoni |
| 2012/0022233 A1 | 1/2012 | Breiter et al. |
| 2014/0273085 A1 | 9/2014 | Eckert et al. |
| 2014/0295404 A1 | 10/2014 | Goldsborough et al. |
| 2017/0191937 A1 | 7/2017 | Levenson et al. |
| 2017/0199104 A1 | 7/2017 | Gradinaru et al. |
| 2019/0113423 A1* | 4/2019 | Goodman ............ G06V 20/698 |
| 2020/0209118 A1* | 7/2020 | Ertürk ................. G01N 33/5088 |

FOREIGN PATENT DOCUMENTS

| | | |
|---|---|---|
| CN | 106289915 A | 1/2017 |
| CN | 106353160 A | 1/2017 |
| CN | 107209093 A | 9/2017 |
| EP | 1605243 A1 | 12/2005 |
| EP | 3249382 A1 | 11/2017 |
| JP | 2001516869 A | 10/2001 |
| JP | 3723204 B1 | 12/2005 |
| JP | 2007183162 A | 7/2007 |
| JP | 2013-522590 A | 6/2013 |
| JP | 2016-185075 A | 10/2016 |
| WO | WO-9402645 A1 | 2/1994 |
| WO | WO-0108714 A1 | 2/2001 |
| WO | WO-2001/44784 A1 | 6/2001 |
| WO | WO-2005001437 A1 | 1/2005 |
| WO | WO-2005/031312 A1 | 4/2005 |
| WO | WO-2012/003463 A1 | 1/2012 |
| WO | WO-2013/122321 A1 | 8/2013 |
| WO | WO-2016/117614 A1 | 7/2016 |

OTHER PUBLICATIONS

Office Action dated Apr. 7, 2022 issued in corresponding European patent application No. 18836819.5.
Satoshi Nojima et al., 'CUBIC pathology: three-dimensional imaging for pathological diagnosis,' *Scientific Reports,* 7: 9269, Aug. 24, 2017, pp. 1-14.
International Search Report PCT/ISA/210 for International Application No. PCT/EP2018/086223 dated May 3, 2019.
Written Opinion of the International Searching Authority PCT/ISA/237 for International Application No. PCT/EP2018/086223 dated May 3, 2019.
International Preliminary Report and Written Opinion for PCT/EP2018/086223 dated Jul. 9, 2020.
Weizhe Li, Ronald N. Germain, and Michael Y. Gerner in "Multiplex, quantitative cellular analysis in large tissue volumes with clearing-enhanced 3D microscopy (Ce3D)", PNAS 2017 114 (35) E7321-E7330.
Etsuo A. Susaki et al: "Whole-Brain Imaging with Single-Cell Resolution Using Chemical Cocktails and Computational Analysis", Cell, vol. 157, No. 3, Apr. 1, 2014 (Apr. 1, 2014), pp. 726-739.
Tainaka Kazuki et al: "Whole-Body Imaging with Single-Cell Resolution by Tissue Decolorization", Cell, vol. 159, No. 4, Nov. 6, 2014, pp. 911-924.
Chinese Office Action dated Oct. 9, 2022 for corresponding Chinese Application No. 201880083062.X, and English-language translation thereof.

* cited by examiner

Delipidation Solutions

| 802 | CUB-1 | CUB-1a | 1.06 | 1.06.1 | 1.07 | 1.07.1 | 1.10 | 1.10.1 | 1.11 | 1.12 |
|---|---|---|---|---|---|---|---|---|---|---|
| quadrol | 25 | 5 | 25 | 25 | 25 | 25 | 20 | 15 | 20 | 15 |
| urea | 25 | 10 | 25 | 25 | 25 | 25 | 20 | 15 | 20 | 15 |
| Detergnt | Tri-X 15 | Tri-X 10 | Tri-X 25 | Tri-X 25 | Tw-80 25 | Tw-20 25 | Tw-80 20 | Tw-80 15 | Tw-80 20 | Tw-80 25 |
| Others | - | - | - | EDTA 2% | - | - | TDE 20 | TDE 15 | TEA 20 | TDE/DMSO 15 |
| PBS -> 100 | Yes | Yes | Yes | Yes | Yes | Yes | Yes | Yes | Yes | Yes |
| PC$_{300}$ | Yes | Yes | Yes | Yes | Yes | Yes | Yes | Yes | Yes | Yes |
| RI | 1.4226 | 1.3712 | 1.4395 | 1.4451 | 1.4351 | 1.4360 | 1.4527 | 1.4215 | 1.4427 | 1.4519 |

Averaged Signal Decrease of 8 Replicates

TISSUE SAMPLE PREPARATION SYSTEM

CROSS-REFERENCE TO RELATED APPLICATIONS

This application is a national phase under 35 U.S.C. § 371 of PCT International Application No. PCT/EP2018/086223 which has an International filing date of Dec. 20, 2018, which claims priority to European Application No. 17211233.6, filed Dec. 29, 2017, the entire contents of each of which are hereby incorporated by reference.

FIELD OF THE INVENTION

The invention relates to the preparation of biological tissue samples for optical analysis, and more particularly to tissue clearing protocols.

BACKGROUND AND RELATED ART

Chemical clearing of tissue samples is becoming a key instrument for the detection and reconstruction of structures in tissue samples, including entire organs. For microscopic analysis, a few tissue types are thin enough to be viewed directly. Most tissues (e.g., biopsy samples, thick tissue samples, complex 3D tissue formations such as organoids or spheroids, whole organs or whole bodies or embryos of small adult mammals like mice) are too thick to allow light to be transmitted through them. Cutting tissue into thin slices has the disadvantage that biomedically important information is lost: biological structures are inherently three-dimensional (3D). Several microscopy techniques are meanwhile available (e.g. confocal microscopy, two-photon microscopy and light-sheet microscopy) for obtaining 3D images of tissues. However, biological specimens are naturally opaque for optical light in the UV-VIS-NIR range.

In general, the main sources of this opaqueness are absorption and scattering. Indeed, biological tissue samples are ultimately constituted by various high-refractive index macromolecules like lipids and proteins immersed in a low-refractive medium (water). The mismatch between the high-refractive index of the biological molecules and the low-refractive index of the intra-and extra-cellular water comprising these molecules results in multiple scattering events, eventually resulting in an opaque sample. Already after a short traveling distance in the tissue, these multiple scattering events lead to a highly reduced number of optical photons traveling on a straight path through the tissue (so called ballistic photons). The more the photons are scattered on their way through the tissue, the more opaque the tissue gets. However, even if there was no scattering at all, total absorption would also lead to a fully opaque (intransparent) tissue sample.

Thus, in order to be examined with a microscope, a specimen whose size exceeds a certain threshold must be "cleared", whereby "clearing" as used herein is the processing of a biological sample such that the scattering of light passing through the sample is reduced, e.g. by reducing the refractive index mismatch between biomolecules and the surrounding medium.

Many if not most of the clearing techniques commonly used today are based on the use of organic solvents. Organic solvent based clearing methods such as e.g. uDISCO rely on the substitution of tissue water with an organic solvent showing a refractive index (RI) of about 1.55, i.e., the typical RI of many tissue types. For example, a mixture of benzyl alcohol and benzyl benzoate (BABB) is used as the organic solvent. Since benzyl benzoate is insoluble in water, an intermediate dehydration step based on butanol is commonly used. This general scheme (dehydration with an organic solvent followed by incubation in high-refractive index organic solvents) is a highly popular clearing technique but has several downsides: it quenches the emission of fluorescent proteins that may already be comprised in the tissue after a short time period, and may cause a significant shrinkage and morphological change of the tissue sample. For example, Weizhe Li, Ronald N. Germain, and Michael Y. Gerner in "Multiplex, quantitative cellular analysis in large tissue volumes with clearing-enhanced 3D microscopy (Ce3D)", PNAS 2017 114 (35) E7321-E7330 show that CUBIC and iDISCO protocols have a negative impact on tissue sample morphology.

SUMMARY

It is an object to provide an improved method of preparing a biological tissue sample for optical analysis, a corresponding system and kit for preparing a biological sample as specified in the independent claims. Embodiments of the invention are given in the dependent claims. The embodiments and examples described herein can be combined freely with each other unless they are not mutually exclusive.

In one aspect, the invention relates to a method of preparing a biological tissue sample for optical analysis. In particular, the biological tissue sample is prepared such that a deviation of the volume and/or morphology of the prepared sample from the volume or morphology of the original tissue is reduced or minimized. The method comprises:
  a) fixing the tissue sample with a first fixation solution;
  b) immersing the fixed tissue sample in a delipidation solution, the delipidation solution comprising a chaotropic agent adapted to induce a swelling of the sample;
  d) staining the tissue sample with one or more staining solutions;
  f) washing and dehydrating the stained tissue sample in an organic dehydration solution, the dehydration solution adapted to induce a shrinking of the sample; and
  g) immersing the fixed tissue sample in an organic clearing solution.

According to some embodiments, at least the washing and dehydration steps may comprise multiple sub-steps, e.g. dehydrating the sample in a series of dehydration solutions with increasing organic solvent concentration. Immersing the fixed tissue sample in a delipidation solution with a chaotropic agent in the context of an organic clearing protocol may be advantageous as it may allow generating a tissue sample with high optical clarity whose volume is identical or at least highly similar to the volume of the tissue sample originally derived from the source organism. This is particularly beneficial if the cleared sample is to be optically analyzed for reconstructing the shape and morphology of the original tissue sample. In the prior art, water-based clearing protocols exist which do not induce a shrinkage of the tissue sample. To the contrary, existing clearing protocols which are based on organic clearing solutions are generally considered to provide tissues with a higher degree of optical clarity but typically induce a strong shrinkage of the sample. Thus embodiments of the invention may allow using organic clearing solutions for preparing tissue sample for further optical analysis without modifying the volume and/or morphology of the tissue sample to a significant extent.

Thus, embodiments of the invention may allow to faithfully image or reconstruct the original 3D morphology of a tissue based on an optical analysis of a cleared tissue sample even for large tissue samples and even for tissue types (e.g. brain tissue) having been observed to strongly shrink in response to a substitution of tissue water by organic solvents.

Using a chaotropic agent may be advantageous as the chaotropic agent destabilizes proteins and membranes, e.g. by unfolding proteins, destabilizing hydrophobic aggregates and increasing the solubility of hydrophobes. The chaotropic agent causes the tissue sample to swell. According to embodiments, the delipidation solution with a chaotropic agent causes the tissue sample to swell by at least 5%, in particular by at least 10%, and in particular in an amount adapted to compensate the shrinkage imposed by the organic clearing agent.

It has been surprisingly observed that both tissue shrinkage induced by the organic solvent and the organic dehydration solutions and tissue swelling induced by the chaotropic agent are tissue type dependent. A significant swelling as well as shrinkage effect is observable in muscle and liver tissue, but the swelling as well as shrinkage effect observable is much more prominent in brain tissue. Using a delipidation solution with a chaotropic agent in a concentration range of 5-30%, and in particular between 15%-25% has been observed to induce a swelling effect that will compensate (in advance) the shrinkage induced by the organic dehydration solutions in a broad range of tissue types.

In a further beneficial aspect, a chaotropic agent may be advantageous as the chaotropic agent will increase tissue clarity by removing lipids, in particular membrane lipids from the tissue, thereby increasing tissue clarity of the finally obtained cleared tissue sample.

Embodiment of the invention may allow optical clearing of even large tissue samples, e.g. any murine organs by means of a simple, fast and less labor-intensive immersion protocol that may ensure that the volume and/or morphology of the tissue sample is conserved. Labor-intensive work, such as transcardiac perfusion to clear blood, and the use of specialized devices to accelerate clearing or staining techniques, may be obsolete. The processing of numerous samples from large cohorts in animal studies or from patients in the context of clinical diagnostics can be performed quickly, reproducibly and optionally in a semi-automated or fully automated manner. Furthermore, a degree of transparency is achieved which allows the measurement of tissue at cellular resolution by a light-sheet microscope, e.g. a 3D light-sheet microscope. By means of the sample preparation method according to embodiments of the invention, the generated samples can be measured in a short time and visualized three-dimensionally with better accuracy thanks to an improved conservation of the original morphology and a significant reduction of light scattering and an increased signal to noise-ratio. For example, according to some embodiments, immune cell populations in tumors or in the tumor microenvironment or other organs or tissues in oncological (and other disease) mouse models or in patient tissue samples can be visualized and co-localized and quantified three-dimensionally. By simultaneous labeling of the vascular structures (e.g. by in-vivo administration of fluorescently labeled lectin) and visualization of the morphology, a profound analysis of the effect of therapeutics in pre-clinical studies on the labeled cell populations can be made. For example, the method may be used for processing tissue samples of humans, e.g. patients in the context of clinical diagnostics. It may not be necessary to stain for the vessels in order to visualize certain cell types in a tumor microenvironment or to investigate the effect of drugs on e.g. immune cell engagement or activity. However, labeling the vessels might be beneficial to investigate the drug biodistribution in the sample (e.g. by using a fluorescently labeled therapeutic compound) or if the drug has a direct effect on the vessels, such as anti-angiogenic drugs.

According to embodiments, the method further comprises c) illuminating the sample with light of a wave length range comprising the wave lengths at which at least one of the fluorescent labels of the staining molecules is excited and/or at which at least one of the fluorescent labels of the staining molecules emits light (excitation and/or emission wave length); the illumination is performed in order to selectively remove or reduce autofluorescence of the sample in said wave length range.

According to preferred embodiments, the selective photo bleaching is performed such that the sample is bleached by a wave length band comprising at least the emission wave lengths of the one or more stains to be used. In case the emission spectrum of the stain is complex and the stain emits a plurality of different wave lengths, the selective photo bleaching is performed for the one or wavelength with the strongest signal. Preferably, the wave length range is chosen narrow, e.g. the wavelength of the stain yielding the strongest signal +/−50 nm. For example, Alexa Fluor 647 and Alexa Fluor 750 are commonly used stains and the selective photo bleaching may be performed using wave length ranges covering at least the most prominent (in terms of signal amplitude) excitation or emission wave length of these stains.

For example, if the at least one stain whose signal is to be analyzed later has an emission peak at 668 nm, the filters for selective photo bleaching may be chosen such that in the bleaching process strong light in the wave length range of 668 nm-50 nm to 668 nm+50 nm, i.e., 618 nm-718 nm, is applied on the sample.

According to other embodiments, the selective photo bleaching is performed such that the sample is bleached by a wave length band comprising at least the excitation wave lengths of the one or more stains to be used. Preferably, the wavelength range covers the excitation spectrum of the autofluorescing structures, but does not cover the excitation spectrum of any stain already contained in the sample (if any).

According to embodiments, the pre-illumination is done in the near UV and/or blue range, e.g. in the range of 100-482 nm. This may be advantageous as most autofluorescing structures can be excited in this range and there will most likely no overlap with the excitation/emission bands of most of the stains used.

In case of no staining has yet been applied to the sample, a broadband illumination could be applied over a wide range of wavelengths. In case a specific staining is already included, a broadband illumination minus the excitation channel of the stain in the sample is preferably applied (e.g. by applying one or more filters for generating light in a particular range that comprises a gap, the gap being a wavelength range being a sub-range of the bleaching-wavelength range and comprising the excitation range of the stain). Preferably, the tissue should not be unconditionally being exposed to high-intensity illumination as it could damage the tissue.

According to embodiments, the selective photo bleaching is performed by illuminating the sample with broad spectral wave length range (referred to in the following as "autofluorescence window"). This "autofluorescence window" comprises a spectral sub-range gap covering an excitation wave length of a stain having been already introduced in the sample by an in-vivo-staining method. The light is selectively applied on the sample within the autofluorescence window but not within this "gap" to ensure that the stain already contained in the sample is not bleached. For example, the "autofluorescence window" is a wavelength range between 450 to 730 nm comprising a sub-range gap between 550 and 580 nm.

These features, also referred to as "selective photo bleaching", may be beneficial as the signal-to-noise ratio may be observed, which is particularly beneficial in the context of weak light signals as commonly obtained in light-sheet microscopy and other optic sample analysis methods. For example, many fluorescence microscopes are equipped with fluorescence filters for selectively stimulating a particular fluorescent stain with selective wave lengths or for selectively allowing wavelength of a certain wavelength corresponding to the emission spectrum of the examined stain to reach the objective. Selectively applying light of a defined wavelength may reduce noise caused e.g. by other fluorescent stains that may be contained in the sample which have a different but partially overlapping emission and/or excitation spectrum with the currently examined fluorescent stain. It has been observed that these filters can also be used for selectively allowing light of a limited wavelength spectrum of a high energy broad spectrum light source to reach a sample. Preferably, the filters are chosen such that selectively light of a limited wavelength spectrum that corresponds to and comprises the emission and/or excitation wavelength of the fluorescent stain(s) to be examined are allowed to reach the sample. The "selective photo bleaching" has the effect that autofluorescence of the sample is reduced particularly in wavelength bands where the fluorescent signal is expected and therefore, an improved signal to noise ratio is obtained. Selective photo bleaching may be particularly advantageous in the context of using multiple fluorescent dyes with different emission spectra, because the bleaching effect may be limited to a comparatively small wavelength range that will typically not overlap with or comprise the emission wavelength of the other fluorescent stains, that are already present when the selective photo bleaching is performed. Thus, embodiments of the invention may allow accurately detecting also weak fluorescence signals of many different fluorescent stains in the context of optical analysis systems typically hampered by a bad signal to noise ratio.

Autofluorescence, which is mainly the effect of formalin based tissue fixation and intrinsic (endogenous) fluorophores, i.e., biomolecules that fluoresce when excited appropriately, and may strongly be increased by immersing the sample in the delipidation and staining solution allows performing a 3D measurement of tissue autofluorescence in the wavelength range between 500 to 600 nm. It has been observed at least in some cases that autofluorescence increases linearly in broad ranges (at least in wave length up to 630 nm) already when samples are merely stored in buffers (e.g., PBS), including classical staining buffers such as TBST or PBST.

The autofluorescence signals provide detailed aspects of organ and tissue morphology. The resulting differences in image contrast may allow for a precise differentiation of individual tissue components. Furthermore, the entire organ and its vascular system can be visualized by in vivo labeling of blood vessel endothelial cells, e.g. with stains like Lectin-AlexaFluor647. The joint acquisition of tissue autofluorescence and vessel architecture can generally be applied to organs with high and moderate optical transparency and low hemoglobin proportion, as light absorption has only limited influence in these tissues. The holistic acquisition of morphological features from organs with high hemoglobin content and low optical tissue transparency (e.g. liver, kidney, heart and spleen) is preferably performed by measuring a near-infrared (NIR) dye, as tissue absorption is highly reduced in this wavelength range (optical window).

According to embodiments, the method further comprises e) fixing the stained tissue sample with a second fixation solution before the washing and dehydration is performed. For example, the second fixation solution can be a 1% PFA in PBS. The fixation with the second fixation solution can comprise gently shaking the sample for about 3-4 hours at room temperature in the second fixation solution.

This additional fixation step may be advantageous as it protects the stains from being washed out and thus allows for a harsh dehydration protocol and improved signal-to-noise ratio. This is particularly beneficial in the context of weak signals and a bad signal to noise ratio as often the case e.g. in light-sheet microscopy. The repeated immersion steps in ascending solvent concentrations during the dehydration steps described later may bear the risk of washing out an existing staining. In particular, antibodies used for staining a target are bound to their targets via non-covalent interactions, which are likely to be severely disturbed when the environment is changed from aqueous to organic. Performing the additional fixation step may help protecting these stains from being washed out during the dehydration process, in particular if ethanol is used instead of butanol (which is considered to be a more gentle solvent than ethanol).

According to embodiments, the composition of the delipidation solution is chosen such that the tissue shrinkage induced by the organic dehydration solution is compensated in advance by the swelling induced by the delipidation solution.

According to embodiments, the chaotropic agent is adapted to cause a swelling of the volume of the sample by at least 15% of the volume of the original sample, or by at least 20% of the volume of the volume of the original sample.

In addition, or alternatively, the composition of the delipidation solution is chosen such that the combined effect of the swelling induced by the delipidation solution and of the shrinking induced by the dehydration solution provides a cleared tissue sample that deviates from the volume of the original, untreated tissue sample by less than 15%, preferably less than 10%, preferably less than 5%.

According to embodiments, the delipidation solution is a water-based clearing solution.

Water-based clearing protocols are currently applied/assumed alternatives to organic-solvent based clearing methods. Thus, although a combination of a water-based and an organic-solvent based clearing approach appears not to make any technical sense, using a water-based clearing solution comprising a chaotropic agent with an organic clearing solution has surprisingly been observed in embodiments of the invention to be highly advantageous as the swelling induced by the chaotropic agent effectively ensures that the volume and morphology of the finally obtained sample immersed in the organic clearing solution is identical or highly similar to the volume and morphology of the original tissue. In a further beneficial aspect, it has been observed that a particularly high degree of optical clarity may be obtained by immersing a sample in a water-based clearing solution with a chaotropic agent and later washing and dehydrating the pre-cleared and swollen sample in organic dehydration solutions to prepare the sample for immersion in an organic clearing solution having the desired RI. According to a further beneficial aspect of immersing the sample in the delipidation solution is that the diffusion resistance of the tissue to various stains in a subsequent ex-vivo staining step is reduced. This reduces the incubation times with the staining solutions, allows the clearing of larger samples and/or allows multiple simultaneous stainings.

According to embodiments, the fixing of the tissue in the first fixation composition, the immersing of the fixed tissue sample in the delipidation solution, the staining, washing and dehydrating and the immersing of the fixed tissue sample in the organic clearing solution are performed in an automated or semi-automated process which does not comprise (i.e. is free of) a perfusion step.

Thanks to the combination of the delipidation agent and the organic clearing agent, a degree of optical clarity is reached even for larger tissues samples that could be achieved in conventional protocols only in protocols for perfused tissue samples or in protocols that include special equipment like electrophoretic chambers. The clearing effect may be further significantly enhanced by using a delipidation solution comprising an amino alcohol. Providing a tissue clearing protocol that does not comprise a perfusion step or additional equipment may be advantageous for many reasons: Often, e.g. if the sample is obtained from a patient, it is not possible to perfuse the tissue before the sample is taken. Sometimes ex-vivo perfusion protocols are used, but those protocols often rely on complex and time consuming manual steps, e.g. for fixing the tissue sample, connecting vessels of the sample with inlets and outlets of perfusion pumps, and the like. Thus, perfusion-based protocols are often considered as unsuited for preparing patent samples for optical analysis or at least unsuited for use in the context of high-throughput sample preparation and analysis. By using a delipidation solution comprising a sufficient amount of detergent for acting as a water-based clearing solution and combining this solution with an organic clearing protocol as described herein for embodiments of the invention, is may be possible to provide a semi-automated or fully automated, perfusion free clearing protocol adapted to prepare even very large tissue samples, e.g. whole-organism preparations of mice, such that they can be fully optically analyzed and used for a 3D reconstruction of the substructures contained therein. Preserving tissue morphology may be particularly advantageous in the context of 3D visualization of cleared tissue samples used to detect tissue abnormalities and pathological changes. In one experimental setting, the tissue morphology and tumor burden of orthotopically grown murine non-small cell lung cancer and renal adenocarcinoma were successfully visualized. This visualization allowed the unambiguous differentiation of pathological tumor tissue from the surrounding healthy mouse tissue, due to significant differences regarding cellular density and/or the vasculature structure. High-resolution images clearly illustrate the distinct transition from physiological to highly irregular and chaotic tumor vessel architecture. Next to morphological parameters, pharmacokinetic characteristics, such as the distribution, penetration and accumulation of fluorescence labeled compounds/therapeutics into tissues and organs, can be addressed to guarantee representative and objective analyses. It was possible to successfully reconstruct the 3D distribution of Trastuzumab-AlexaFluor750 in healthy murine kidney tissue compared to a renal adenocarcinoma. The labeled antibody circulated within the normal kidney vasculature, whereas binding to immune effector cells—probably via the Fc part of the antibody—and accumulation in necrotic tissue areas was only observed in the tumor region. In principle, such 3D analysis of fluorescent labeled molecules and/or cells can be transferred to any other organ and tissue type.

According to embodiments, the organic clearing solution is dibenzylether.

According to alternative embodiments, the organic clearing solution is a mixture of benzyl alcohol and benzyl benzoate (BABB).

The method comprises preparing the organic clearing solution. The preparation of the organic clearing solution comprises choosing the ratio of benzyl alcohol and benzyl benzoate such that the refractive index of the organic clearing solution is identical or similar to the refractive index of the tissue type of the sample.

According to further embodiments, the organic clearing solution is a mixture of DPE (diphenylether), benzyl alcohol and benzyl benzoate (BABB).

The method comprises preparing the organic clearing solution. The preparation of the organic clearing solution comprises choosing the concentration of DPE in the organic clearing solution such that the refractive index of the organic clearing solution is identical or similar to the refractive index of the tissue type of the sample.

Adapting the ratio of benzyl alcohol and benzyl benzoate in accordance with the tissue type analyzed may be advantageous, because it has been observed that the RI differs slightly in different tissue types. According to embodiments, the ratio of benzyl alcohol and benzyl benzoate is chosen such that the resulting organic clearing solution has an RI of about 1.54-1.58. This was observed to be an RI range suitable for many tissue types which typically also have an RI in the same range.

According to embodiments, the method comprises generating an organic clearing solution being adapted for optically clearing tissue samples of a particular type of tissue by determining the RI of this tissue type empirically or by literature study. The organic clearing solution can also be referred to as "RI matching solution" or "immersion solution". Then, the composition of the organic clearing solution is chosen such that the desired RI is reached.

For example, the generation of an organic clearing solution with a defined RI can be performed by generating a series of about 10 BABB solutions having different BA:BB ratios; immersing a sample of said particular tissue (that was already completely dehydrated in a plurality of washing and dehydration steps) in each of said 10 BABB solutions and determining the one of the 10 BABB solutions within which the RI of the tissue sample shows the greatest similarity (and the smallest amount of light scattering). Alternatively, 10 BABB solutions with constant BA:BB ratio but with an increasing concentration of diphenyl ether can be used for identifying an organic clearing solution whose diphenyl ether concentration results in an RI that matches the RI of a cleared tissue.

According to embodiments, the sample is a tissue sample of a non-human or human organism. In particular, the sample is a tissue sample of a human and non-human mammal. For example, the sample can be a biopsy sample of a patient, e.g. a sample from a tumor tissue or healthy tissue. For example, the sample can be a biopsy or slice of human liver, brain, kidney, muscle, colon or lung tissue.

According to embodiments, the sample has a volume of at least 0.5 cm$^3$, or of at least 0.75 cm$^3$, or at least 1 cm$^3$. In some embodiments, the sample is a whole organ sample, e.g. the brain or the liver of a mouse or rat. In some embodiments, the tissue sample is a whole organism, e.g. a whole mouse or a whole embryo, e.g. of a mammal.

According to embodiments, the sample comprises a reporter protein or a stained biomarker, drug or metabolite already before the sample is fixed with the first fixation solution. For example, the reporter protein can be a protein like GFP having been introduced to the organism from which the sample was taken via genetic engineering. For example, transgenic mice or rats may express the GFP selectively in some tissue types or tissue sub-regions where a tissue-type-sensitive or tissue sub-region sensitive promoter of the GFP was activated. In addition, or alternatively, the tissue may comprise a drug or other substance that was labeled with a reporter molecule. For example, a patient may have been injected a fluorescence-labeled drug into the bloodstream some minutes before the tissue sample was taken and the sample may comprise an accumulation of the labeled drug in specific cell types within the sample. Thus, for various reasons ranging from genetic engineering to the intake of fluorescence labeled drugs, a tissue sample may already comprise some stained molecules, referred herein also as "in-vivo-stained molecules" and the respective technology of introducing such molecules in an organism may be referred to as "in-vivo staining method". The in-vivo staining methods can be combined with ex-vivo staining methods. In this case, the stains should be chosen such that their emission spectra can be easily distinguished from each other.

According to embodiments, the method further comprises generating a 3D plot of stained sub-structures of the cleared tissue sample using 3D fluorescence microscopy, e.g. a light-sheet fluorescence microscopy (LSFM).

Said features may be advantageous as it has been observed that 2D examination of few individual tissue slices provides only a limited insight into inhomogeneous tissue structures and might therefore not necessarily reflect the overall situation. Especially in tumor analysis this aspect is of great relevance, because inhomogeneity is particularly high in such tissue types. Furthermore, complex morphological relationships, such as the vessel architecture, can only be fully understood in three dimension. Therefore, only the three-dimensional (3D) analysis of whole tissue specimen provide an appropriate solution for an overall and representative tissue assessment. However, the digital 3D reconstruction of formalin-fixed, paraffin embedded (FFPE) tissue samples on the basis of individual tissue slices, is a very laborious and time-consuming process. Furthermore, the mechanical distortion of the tissue slices, caused by the cutting process, make a subsequent 3D reconstruction very difficult to perform and increased susceptibility to errors. Embodiments of the invention may allow overcoming the problems and limitations of conventional microtome-based histopathology by providing an improved sample clearing protocol adapted to generate tissue samples with conserved morphology which are highly transparent, thereby providing the basis for 3D analysis of transparent tissue specimen at cellular resolution using non-destructive imaging methods, such as light-sheet microscopy.

An enormous number of different tissue clearing protocols exist, which are mainly applied for 3D analysis of endogenously labeled neural networks, for instance in rodent spinal cord and brain. Despite great success in neuroscience and embryonic development, the imaging technology still offers considerable potential for other scientific areas. First studies have demonstrated its great value for cancer research and preclinical drug development. Embodiments of the invention may allow integrating 3D imaging technology in the field of histopathology.

The tissue clearing method described herein for various embodiments of the invention, was successfully applied for three-dimensional, non-destructive and multiplex analysis of whole-mouse organs, orthotopic tumor xenografts and syngeneic tumors, and human tumor tissue samples at cellular resolution. It was shown that embodiments of the invention may provide cleared tissue samples that are more favorable both in terms of tissue integrity and transparency than sample obtained by existing organic clearing based approaches.

In addition or alternatively, the method further comprises analyzing the cleared tissue sample using Raman spectroscopy. Raman spectroscopy is a spectroscopic technique used to observe vibrational, rotational, and other low-frequency modes in a system, e.g. a biological tissue sample. Raman spectroscopy is commonly used in chemistry to provide a structural fingerprint by which molecules can be identified, but can also be used in biology and in particular histology and high-throughput diagnostics for obtaining information on the morphology of a particular tissue sample and its sub-structures. Raman spectroscopy relies on inelastic scattering, or Raman scattering, of monochromatic light. Using tissue samples that are optically highly clear may ensure that the scattering of light that represents noise is reduced. As a further advantage, the laser light can penetrate deeper into the tissue, thereby allowing optical analysis of larger or higher absorbing samples.

In addition or alternatively, the method further comprises analyzing the cleared tissue sample using photoacoustic imaging (optoacoustic imaging). Photoacoustic imaging is a biomedical imaging modality based on the photoacoustic effect. In photoacoustic imaging, non-ionizing laser pulses are delivered into biological tissues (when radio frequency pulses are used, the technology is referred to as thermoacoustic imaging). Some of the delivered energy will be absorbed and converted into heat, leading to transient thermoelastic expansion and thus wideband (i.e. MHz) ultrasonic emission. The generated ultrasonic waves are detected by ultrasonic transducers and then analyzed to produce images. It is known that optical absorption is closely associated with physiological properties, such as hemoglobin concentration and oxygen saturation. As a result, the magnitude of the ultrasonic emission (i.e. photoacoustic signal), which is proportional to the local energy deposition, reveals physiologically specific optical absorption contrast. 2D or 3D images of the targeted tissue sample can then be formed. Using tissue samples that are optically highly clear may ensure that the scattering of laser light that would increase the background noise is reduced.

In a further aspect, the invention relates to an automated or semi-automated system for preparing a biological tissue sample for optical analysis. In particular, the sample is prepared such that a deviation of the volume and/or morphology of the prepared sample from the volume or morphology of the original tissue is reduced or minimized. The system is configured for:

receiving a fixed tissue sample, the fixed tissue sample having been fixed with a first fixation solution;

immersing the fixed tissue sample in a delipidation solution, the delipidation solution comprising a chaotropic agent adapted to induce a swelling of the sample;

staining the tissue sample with one or more staining solutions;

dehydrating the stained tissue sample in an organic dehydration solution, the dehydration solution adapted to induce a shrinking of the sample; and immersing the fixed tissue sample in an organic clearing solution.

According to embodiments, the system is further configured for performing the following steps (which correspond to further steps of the sample preparation method):

Washing off the delipidation solution;

Immersing the sample in a blocking solution after having washed off the delipidation solution in order to minimize unspecific binding of the staining molecules in the subsequent step;

Washing off the staining solutions.

According to embodiments, the system comprises a reagent container for each one of a plurality of solutions comprising a delipidation solution, one or more staining solutions, a second fixation solution, an organic dehydration solution and an organic clearing solution. According to embodiments, the system can comprise additional containers and/or units, e.g. for one or more washing buffers, additional staining solutions, blocking solutions and the like. The number of reagent containers and/or units may depend on the particularities of the sample preparation protocol used, including particularities of one or more staining protocols for staining the sample(s).

According to some first embodiments, the system comprises a sample transport means and a plurality of sample containers respectively being coupled to one of the reagent containers. The system is configured to coordinate the sample transport semi-automatically or fully automatically such that the sample is immersed in each of the plurality of solutions at least once in accordance with embodiments of the sample preparation system described above.

According to alternative second embodiments, the system comprises one or more pumps respectively being coupled to one of the reagent containers and to a sample container. The system is configured to coordinate the pumps such that the sample is immersed in each of the plurality of solutions at least once in accordance with embodiments of the sample preparation system described above.

According to some embodiments, the system comprises also a reagent container for the first fixation solution. According to some embodiments, the control unit is configured to coordinate the sample transport semi-automatically or fully automatically such that the sample is immersed also in the first fixation solution for a sufficient time to ensure fixing of the tissue sample. According to an alternative embodiment, the system comprises a pump coupled to the reagent container with the first fixation solution and a control unit configured to coordinate the pumps such that the sample is immersed also in the first fixation solution for a sufficient time to ensure fixing of the tissue sample.

The transfer of the tissue sample from one unit with a respective sample container to the next may be performed manually, semi-automatically or fully automatically using the sample transportation system. Likewise, the exchange of the solutions in the single sample container of the system according to the second embodiments can be performed automatically, semi-automatically or manually.

The system may comprise one or more containers for immersing one or more samples in the delipidation solution, staining solution, washing solutions, clocking solutions, dehydration solutions and organic clearing solution and in a second fixation solution, if any. The system may further comprise bottles for each of said solutions operatively connected to the one or more containers via ducts, pumps and valves. The system may further comprise an automated transport means, e.g. a conveyor belt or an robotic arm for transporting the biological samples from one sample container to the next. The system further comprises a control unit adapted to coordinate the interaction of the sample transport means, pumps, and valves such that the sample processing method according to embodiments of the invention is performed.

In a further aspect, the invention relates to a kit for preparing one or more tissue samples. The kit comprises a delipidation solution and an organic clearing solution. The delipidation solution comprises 5%-30%, preferably 5%-15% by volume at least one chaotropic agent and 5-30% by volume at least one detergent.

According to embodiments of the invention, the kit is adapted for preparing a biological tissue sample for optical analysis. In particular, the kit is adapted for preparing the tissue sample such that a deviation of the volume and/or morphology of the prepared sample from the volume or morphology of the original tissue is reduced or minimized.

Using the above specified amount of a chaotropic agent may be advantageous as it may induce a significant swelling of the tissue sample and a hyperhydration of the tissue. The swelling eases and accelerates the penetration of staining solutions and the dehydration solutions, thereby allowing to perform subsequent steps faster than in state of the art organic clearing protocols.

Adding a detergent to the delipidation solution may be beneficial as lipids, in particular membrane lipids, are removed, thereby reducing light scattering and increasing the permeability of the tissue sample.

According to embodiments, the at least one detergent is a combination of at least two different detergents. In particular, the combination of at least two different detergents can comprise or consist of a combination of triethanol amin (TEA) and Tween-80.

The optical tissue transparency obtained by a sample preparation protocol and respective kit according to embodiments of the invention was observed to be superior to the prior art both in terms of tissue clarity and in terms of morphological stability (authenticity). The sample processing method and kit according to embodiments of the invention creates samples with an excellent refractive index (RI) and a homogeneous tissue immersion in particularly short time, e.g. within two days for many small and medium-sized samples. The total time required may depend on tissue type and sample size. For example, a whole mouse kidney may be cleared completely after three days of immersion in the delipidation solution and 1,5 days in the dehydration and organic clearing solution. In contrast, organic clearing protocols known in the art, e.g. some BABB based clearing protocols, provide samples with greater light scattering and light absorption. Water-based clearing protocols known in the art, e.g. CUBIC-2 and RIMS based clearing protocols, cause disturbing schlieren lines and optical aberrations.

According to embodiments, the chaotropic agent is urea or thio-urea.

A plurality of other chaotropic agents are known, e.g. n-butanol, ethanol, lithium perchlorate, lithium acetate, magnesium chloride, phenol, 2-propanol, or sodium dodecyl sulfate. However, the use of non-ionic chaotropic agents, in particular urea or thio-urea was observed to provide significantly better results in terms of tissue permeability, the removal of membrane liquids and/or osmotic constance than any of the other chaotropic agents. For example, some chaotropic agents like MgCl have undesired osmotic properties.

According to embodiments, the detergent is Tween-80. According to alternative embodiments, the detergent is triton X-100, tween-20, or similar detergents or a mixture thereof.

According to embodiments, the delipidation solution further comprises 5-30%, preferably 10-25%, preferably 15-25%, more preferably 20-25% (by volume) of an amino alcohol.

For example, the amino alcohol can be N,N,N',N', tetrakis (2-hydroxypropyl)ethyl-enediamine, commercially available as "Quadrol".

Using an amino alcohol as a further component may have the advantage that molecules acting as strong absorbents such as various components of the blood, e.g. Hemoglobin, are removed from the tissue sample. This will reduce the absorption of the tissue sample and thus increase optical clarity of the tissue.

According to preferred embodiments, the amount of amino alcohol comprised in the delipidation solution positively correlates with the amount of hemoglobin contained in the tissue sample that is to be optically analyzed. For example, liver samples typically comprise a large amount of hemoglobin and the delipidation solution in this case preferably comprises about 20-25% by volume the amino alcohol. Brain samples comprise only small amounts of hemoglobin and may be treated with a delipidation solution that is free of or comprises only a small amount of less than 15% by volume the amino alcohol. Reducing the amount of amino alcohol may have the advantage that the costs of the delipidation solution is reduced and that the viscosity of the delipidation solution is also reduced. Highly viscous delipidation solutions having a large portion of the amino alcohol may require additional time and effort, e.g. extra washing steps, in order to remove the delipidation solution from the sample to allow a quick penetration of the sample with other liquids, e.g. the staining solution. The skilled person is able to adapt the amount of amino alcohol contained in the delipidation solution to the amount of hemoglobin that is contained in the sample.

In an experimental test, the majority of murine tissue samples obtained according to embodiments of the invention showed moderate to high optical tissue transparency even in case the delipidation solution did not comprise an amino alcohol. However, in organs with a naturally large proportion of hemoglobin, such as liver, kidney, heart and spleen, the clearing effect provided by the delipidation solution was significantly increased and the hem-related problems were overcome by adding an amino alcohol to the delipidation solution, the hem-related problems were overcome or at least reduced.

According to embodiments, the delipidation solution further comprises thio-diethanol. It was observed that adding thio-diethanol to the delipidation solution may further increase the clarity of the tissue.

According to embodiments, the delipidation solution being a buffered solution adapted to stabilize the pH value. For example, the delipidation solution can be 10× PBS (phosphate-buffered saline).

According to embodiments, the delipidation solution further comprises DMSO (dimethyl sulfoxide). Adding DMSO to the delipidation solution may have the advantage that the viscosity and thus also the incubation time required for letting the delipidation solution completely penetrate the sample is reduced. This may be particularly advantageous in the context of a large scale, automated sample processing pipeline.

According to embodiments, the delipidation solution further comprises antimicrobial agents, e.g. broad spectrum antimicrobial suited as a preservative for in vitro diagnostic (IVD) assays. Preferably, the antimicrobial agent does not inhibit most enzymes, antibody binding, nor interfere with ISE electrodes. An example of such an antibiotic agent is ProClin 300 of SigmaAldrich.

According to embodiments, the delipidation solution further comprises salts, e.g. NaCl for modulating osmotic properties of the delipidation solution.

According to one embodiment, the delipidation solution comprises 20% by volume urea, 20% by volume Tween-80, 20% by volume Quadrol, 20% by volume Thiodienthanol. After dissolving all components in PBS the solution was filled up to the final volume with PBS. In a preferred exemplary embodiment, the delipidation solution further comprises ProClin 300 or another antimicrobic agent as recommended by the supplier. Said composition has been shown to provide tissue samples with a particular high degree of transparence.

According to another embodiment, the delipidation solution comprises 15% by volume urea, 15% by volume Tween-80, 15% by volume Quadrol, 15% by volume Thiodienthanol. After dissolving all components in PBS the solution was filled up to the final volume with PBS.

According to another embodiment, the delipidation solution comprises 10% by volume urea, 20% by volume Quadrol, 5% by volume Tween-80, 5% triethanol amine (TEA), and 5% dimethylsulfoxid (DMSO). Optionally, a fluorescent dye can be added to the delipidation solution that may be used for highlighting some tissue structures or cellular components. For example, the delipidation solution can comprise a fluorescent dye that is adapted to selectively stain cell nuclei, e.g. propidium iodide. According to one example, the delipidation solution comprises about 3 μg propidium iodide per ml of the delipidation solution.

The delipidation solution can be created by dissolving all components in a PBS solution and then filling up this PBS solution with pure PBS buffer up to the final volume.

In an exemplary embodiment, the delipidation solution further comprises ProClin 300 (e.g. 0.5% by volume) or another antimicrobic agent as recommended by the supplier. Said composition has been shown to provide tissue samples which are particularly adapted to preserve the strength of fluorescent signals having been introduced in the tissue in an in-vivo "staining" protocol.

According to embodiments, the kit further comprises a first fixation solution. The first fixation solution comprises a fixation agent selected from formaldehyde (formalin), paraformaldehyde (PFA), gluteraldehyde, and glyoxal.

According to embodiments, the kit further comprises a second fixation solution comprising 1% PFA in PBS.

According to embodiments, the kit further comprises one or more dehydration solutions, e.g. 70% ethanol, 95% ethanol and 100% ethanol.

According to embodiments, the kit further comprises one or more washing solutions and/or blocking solutions.

According to embodiments, the kit further comprises a container for immersing the sample in the organic clearing solution and for performing the optical analysis of the sample in the container while the sample is immersed in the organic clearing solution.

According to some embodiments, the kit is generic and for preparing tissue samples of many different types and species for optical analysis. According to other embodiments, the kit is specific for a particular tissue type and/or for a particular species.

According to embodiments, the kit comprises one or more staining solutions. According to some embodiments, the stain(s) are antibody-based, i.e., use one or more antibodies for selectively attaching a stain to a biomarker. According to other embodiments, the stain(s) in the one or more staining solutions are not antibody-based fluorescent stains, but rather fluorescent Fab2-fragments or fluorescent Quantum dots (QDs). QDs are very small semiconductor particles, only several nanometres in size, so small that their optical and electronic properties differ from those of larger particles. They are a central theme in nanotechnology. Many types of quantum dot emit light of specific frequencies if electricity or light is applied to them, and these frequencies can be precisely tuned by changing the dots' size, shape and material. Due to their small side, the use of nano dots in the context of the present invention may be particularly beneficial as their use allows to further reduce the incubation time during the staining, thereby reducing the amount of time necessary or performing the clearing protocol.

According to embodiments, the staining solution comprises a chromogenic stain.

According to other embodiments, the staining solution comprises a fluorescent stain.

In an experimental test, several tissue targets of murine tissue samples were stained both with chromogenic- and fluorescence-based IHC protocols in serial tissue slices of a mouse kidney having been cleared in accordance with a tissue preparation method of embodiments of the invention. Obtained stainings demonstrated no significant differences regarding tissue morphology and target specificity between chromogenic and immunofluorescence staining protocols. Furthermore, the comparison of chromogenic tissue stainings from cleared and non-cleared tissue sections of the same mouse organ or tumor xenograft, exhibited exemplarily no differences in the specificity of H&E, Trichrome, CD31 and 150 Ki67 stainings. Only a marginal reduction of the signal intensity was observed in cleared tissue slices.

A "sample" or "tissue sample" as used herein is a piece of tissue removed from an organism, e.g. a biopsy, or a whole organ of an organism or even a whole organism. For example, a whole-organ sample can be a whole liver, brain, lung or heart of an adult mouse or rat. A whole-organism sample can be e.g. an embryo.

An "original tissue" as used herein is the tissue in the state before the sample preparation method described herein for embodiments of the invention is applied. For example, the "original tissue" can be a tissue sample in the state before it was immersed in the first fixation solution, e.g. a tissue sample stored in a PBS or other buffer for further processing. In other embodiments, the "original tissue" refers to the tissue in the state before or right after obtaining the sample from an organism.

A "chaotropic agent" is a substance which increases the entropy of the system by interfering with intramolecular interactions mediated by non-covalent forces such as hydrogen bonds, van der Waals forces, and hydrophobic effects. Chaotropic solutes can decrease the net hydrophobic effect of hydrophobic regions because of a disordering of water molecules adjacent to the protein. This solubilizes the hydrophobic region in the solution, and may in some cases denature a protein. Chaotropic agents may shield charges and prevent the stabilization of salt bridges. Thus, a "chaotropic agent" as used herein is in particular a molecule that—when solved in water—can disrupt the hydrogen bonding network between water molecules (i.e. exerts chaotropic activity). This has an effect on the stability of the native state of other molecules in the solution, mainly macromolecules (proteins, nucleic acids) by weakening the hydrophobic effect. For example, a chaotropic agent reduces the amount of order in the structure of a protein formed by water molecules, both in the bulk and the hydration shells around hydrophobic amino acids, and may cause its denaturation.

According to some embodiments, the "chaotropic agent" is a substance that is adapted to induce a swelling of the volume of the sample by at least 15% of the volume of the original sample, or by at least 20% of the volume of the original sample. For example, the "chaotropic agent" is a substance that is adapted to induce a swelling of the volume of the sample by at least 15% of the volume of the original sample, and in particular by at least 20% of the volume of the original sample, after immersing the sample in a solution comprising about 5% (by volume) of the chaotropic agent for less than three days.

Preferably, the chaotropic agent is a non-ionic chaotropic agent such as urea and thio urea.

According to other embodiments, the chaotropic substance is the ionic chaotropic guanidinium that is provided in the form of a guanidinium salt, e.g. guanidinium chloride, guanidinium hydrochloride or guanidinium thiocyanate.

Guanidinium is a planar ion that may form weak hydrogen bonds around its edge but may establish strongly-held hydrogen-bonded ion-pairs to protein carboxylate groups, like commonly found quaternary structural arginine-carboxylate 'salt' links. The spread-out positive charge causes the nitrogen atoms to be poor hydrogen-bond acceptors. Also, guanidinium possesses rather hydrophobic surfaces that may interact with similar protein surfaces to enable protein denaturation.

The said chaotropes have the advantage that they allow macromolecules more structural freedom and encourage protein extension and denaturation by weakening hydrogen-bonds. Urea hydrogen bonds to itself and any protein present in the absence of sufficient water. It so becomes more hydrophobic and hence more able to interact with further sites on the protein, leading to localized dehydration-led denaturation. In addition, urea and thiourea are adapted to replace and remove water from the protein surface, thereby also denaturing proteins. Both urea and guanidinium increase the radius of gyration of any intrinsically disordered protein. Hence, the above mentioned substances are particularly suited for denaturizing proteins.

In a further beneficial aspect, the said substances do not significantly increase the viscosity of the delipidation solution. Hence, it is possible to achieve a strong protein denaturization and protein extension effect while keeping the dilapidation solution non-viscous. Non-viscous liquids ease sample handling and processing and may allow to remove the delipidation solution from the sample quickly.

According to some embodiments, the "chaotropic agent" is a polar substance that has a water-solubility of at least 100 g·l−1 at 20° C.

A "delipidation solution" as used herein is a water-based solution comprising at least one chaotropic agent and a detergent adapted to reduce the amount of lipids in a tissue sample.

A "water based clearing solution" as used herein is a water-based solution comprising at least one detergent that is adapted to reduce the light scattering of a tissue sample having been immersed in the water based clearing solution. Various water-based clearing solutions used in water based tissue clearing protocols which are used as alternatives to organic solvent based clearing methods exist, for example, "CUBIC-1". A water based clearing solution can be a hydrophilic clearing solution, i.e., a water-based solution that solely or predominantly comprises hydrophilic substances. For example, the water-based solution can be water, or 1× PBS (phosphate-buffered saline), or 10× PBS or PBST (PBS with Tween) or similar buffers that comprise the at least one detergent. To the contrary, an "organic solution" according to embodiments of the invention is an organic-solvent or a solution basically consisting of an organic solvent. Accordingly, an "organic clearing solution" is an organic-solvent or a solution mainly consisting of an organic solvent that is adapted for and used as a tissue clearing solution. A solution that is adapted for use as a clearing solution is adapted to make a tissue sample translucent or even transparent by immersing the tissue sample in the clearing solution. A widely used organic clearing solution is BABB.

The "perfusion of a tissue" is the act of pouring a liquid through the vessels or other cavities of a specific organ.

A "kit" as used herein is a composition of solutions that is designed for and allows carrying out a laboratory workflow (e.g. a sample preparation workflow or parts thereof, e.g. a sample staining workflow or a sample clearing workflow) in an extremely standard condition, which is quicker than the traditional laboratory practices that have led to the identification and development of the kit-based experimental workflow.

The expression "preparing a sample such that a deviation of the volume and/or morphology of the prepared sample from the volume or morphology of the original tissue is reduced" as used herein means that the volume/morphology change imposed by embodiments of the tissue preparation method described herein is smaller than the volume/morphology change imposed by state of the art organic solvent based clearing methods.

In a further aspect, a method of preparing a tissue sample such that the signal-to-noise ratio of the sample subjected to optical analysis is increased is described herein. The method comprises:

identifying a wave length of a light signal that is to be generated by a stain, the stain to be used for staining the tissue sample or selected components thereof;
illuminating the sample with light of a wave length range comprising the identified wave lengths for selectively removing or reducing autofluorescence of the sample in said wave length range.

Said process may also be referred herein as "selective photo bleaching". For example, the stain can be a fluorescent stain and the particular wavelength is the emission wave length of the stain or one of the multiple emission wave length of the stain. For example, the particular wavelength can be the one of the multiple emission wave length of the stain yielding the strongest signal. For example, the wave length range is determined by adding 50 nm to and subtracting 50 nm from the wavelength of the stain yielding the strongest signal, the result of the addition and the subtraction providing the borders of the wave length range. According to embodiments, the method further comprises staining the tissue sample with the stain. For example, the stain can be adapted for selectively binding to particular biomarkers, e.g. particular proteins or to particular nucleic acid sequences. According to embodiments, the selective photo bleaching can be used as one step in a sample preparation workflow for clearing a tissue sample.

In a further aspect, the invention relates to a method of preparing a biological tissue sample for optical analysis such that the optical clarity of the tissue sample is increased. The method comprises: a) fixing the tissue sample with a first fixation solution; b) immersing the fixed tissue sample in a delipidation solution, the delipidation solution comprising a chaotropic agent adapted to induce a swelling of the sample; d) staining the tissue sample with one or more staining solutions; f) dehydrating the stained tissue sample in an organic dehydration solution, the dehydration solution adapted to induce a shrinking of the sample; and g) immersing the fixed tissue sample in an organic clearing solution.

In a further aspect, the invention relates to an automated or semi-automated system for preparing a biological tissue sample for optical analysis. In particular, the sample is prepared such that the optical clarity of the tissue sample is increased. The system is configured for: receiving a fixed tissue sample, the fixed tissue sample having been fixed with a first fixation solution; immersing the fixed tissue sample in a delipidation solution, the delipidation solution comprising a chaotropic agent adapted to induce a swelling of the sample; staining the tissue sample with one or more staining solutions; dehydrating the stained tissue sample in an organic dehydration solution, the dehydration solution adapted to induce a shrinking of the sample; and immersing the fixed tissue sample in an organic clearing solution.

In a further aspect, the invention relates to a kit for preparing tissue samples for optical analysis. In particular, the sample is prepared such that the optical clarity of the tissue sample is increased. The kit comprises a delipidation solution and an organic clearing solution. The delipidation solution comprises 5%-30%, preferably 5%-15% by volume at least one chaotropic agent and 5-30% by volume at least one detergent.

All features and embodiments described herein in respect to the method, system and kit adapted and configured for preparing a biological tissue sample for optical analysis such that a deviation of the volume and/or morphology of the prepared sample from the volume or morphology of the original tissue is minimized or reduced can be freely combined with the method, system and kit adapted and configured for preparing a biological tissue sample for optical analysis such that the optical clarity of the tissue sample is increased.

BRIEF DESCRIPTION OF THE DRAWINGS

In the following embodiments of the invention are explained in greater detail, by way of example only, making reference to the drawings in which:

FIG. 1 shows steps of a clearing protocol 100 used for preparing a biological tissue sample for optical analysis.

Figure 1:
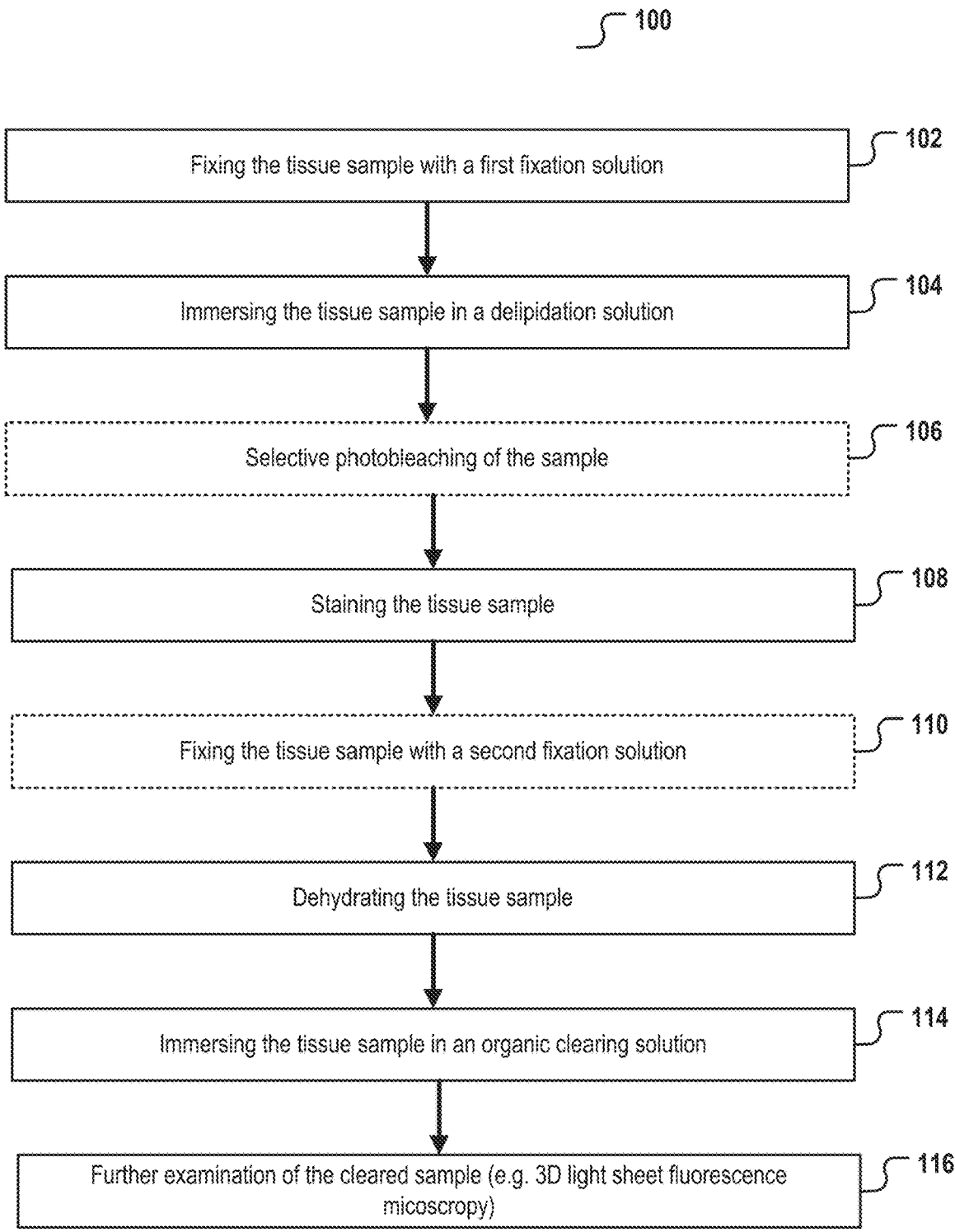
FIG. 1 shows a method of preparing a biological tissue sample for optical analysis.

Embodiments of the invention may use a combination of an aqueous delipidation solution which may induce a swelling as well as pre-clearing of the sample and of organic dehydration and clearing solutions for achieving a high degree of transparency of the sample while at the same time the volume and morphology of the sample is maintained. Furthermore, an additional fixation step following the staining step may help conserving the signal strength of in-vivo incorporated fluorescence stains. Thus, embodiments of the invention may allow labeling of selected target structures in the tissues by fluorescent substances and preserving these stains through the whole sample clearing workflow.

In some experimental settings, an optional in-vivo staining step may be performed. For example, a fluorescent molecule may be introduced into a test animal in vivo (signal 1). The fluorescent molecule may be a fluorescent reporter protein introduced into an organism by means of genetic engineering. In addition, or alternatively, the fluorescent molecule can be a fluorescent-labeled drug or metabolite injected or otherwise applied to a living organism, e.g. a laboratory animal. In other experimental settings, the organism does not comprise any fluorescent-labeled molecules when the sample is taken.

In-vivo staining may be a useful technique in various biomedical settings. According to one example (orthotopic lung cancer xenograft), tissue samples from tumor bearing animals can be created as follows: an orthotopic lung cancer xenograft is created by tail vein injection of NSCLC cells (3×10e6 cells/100 µl PBS) in SCID mice. The circulating tumor cells settle in the lung and start to proliferate. After a tumor cell type specific time, e.g. after 25 days, the tumor reaches optimal size for further examination. The animals receive intravenous tail vein injection of 100 µg Lectin-AlexaFluor647 and are euthanized after five minutes of incubation. Then the lung can be explanted for ex vivo analysis of the whole lung organ. Alternatively, parts of the lung may be taken. In addition, tissues from tumor-free animals can be obtained as a control. For example, SCID mice can be intravenously injected with 100 µg Lectin-AlexaFluor647 via tail vein. After five minutes of incubation, the animals are euthanized and different organs and tissue samples are explanted for generating tissue samples for ex vivo analysis.

The tissue sample can be a tissue sample of a human or non-human animal. The tissue sample can be, for example, a biopsy sample, a thin slice of tissue, a whole-organ tissue sample or even a whole organism sample, e.g. embryos or small mammals. The sample can be retrieved from a tissue bank or another source, e.g. a cooled sample storage unit. The sample may be immersed in a buffer, e.g. PBS, and stored at about 4° C. or lower in the sample storage unit.

Next in step 102, the state of this tissue is then preserved by immersing the sample in a first fixation solution, e.g. a formalin-based fixation solution as used in various standard clearing protocols. The duration of this stem may depend on the type and size of the tissue sample. The tissue sample can be incubated in a first fixation solution for about 24 hours at 4° C. in the dark. These conditions have been observed to be applicable for many different tissue types and for samples of up to 1 cm in diameter. It may be possible to reduce the incubation time e.g. for smaller tissues. The first fixation solution can have a comparatively low concentrated fixans, e.g. about 10% buffered formalin.

In a subsequent step 104, the sample is immersed in a water-based delipidation solution. The delipidation solution comprises a chaotropic agent adapted to induce a hyperhydration and a significant swelling of the tissue. This makes the tissue more permeable to fluids and eases and accelerates the clearing of the tissue sample by the organic clearing solution diffusing into the sample. In addition, the delipidation agent comprises a detergent adapted to remove many biomolecules which induce light scattering from the tissue, in particular membrane lipids. The removal of the lipids further increases the permeability of the tissue for further substances, e.g. stains, fixation solutions, dehydration solutions and the organic clearing solution. Further ingredients of the delipidation solution, in particular an amino alcohol, may remove further absorbent components from the tissue sample, in particular, blood components such as heme groups, thereby further improving transparency of the sample. Thus, a result of step 104 is a swollen, pre-cleared tissue sample that shows a greater optical clarity (reduced light scattering) than the original tissue sample.

According to some embodiments, a fluorescent nuclear marker molecule may be contained in the delipidation solution. The nuclear marker molecule is adapted to selectively stain cell nuclei. Thus, the delipidation solution may be used for introducing a further signal ("nuclear signal") into the tissue sample that allows detecting and visualizing cell nuclei. An example of a fluorescent nuclear marker is described e.g. in Satoshi Nojima et al.: "CUBIC pathology: three-dimensional imaging for pathological diagnosis" Scientific Reports, 24 Aug. 2017. Adding a nuclear marker as component of the delipidation solution may save an extra staining step and thus may significantly accelerate the sample preparation procedure.

Tissue samples in the size of up to 1 cm$^3$ (e.g. murine whole organ samples or large biopsies of human patients) are immersed in the delipidation solution preferably for 1-4 days at temperatures between 25-37° C. Higher temperatures provide for a better clearing but may reduce the signal strength of in-vivo stains in the sample, if any, and may result in a partial denaturation of some proteins and biomarker and thus may destroy some epitopes such that a detection of said epitopes is made difficult.

It has been observed that the immersion of the sample in the delipidation solution greatly increases autofluorescence in certain wavelength ranges. This may be beneficial as it improves the overall contrast of the tissue sample relative to the background, and allows to easily detect the borders of the tissue sample. However, the increased autofluorescence may cover the emission wavelength range of the fluorescent stains that will be introduced in step 108 and/or that have already been introduced as in-vivo stains, which is an undesired effect. In this case, in an additional step 106 may optionally be performed.

Step 106, also referred to as "selective photo bleaching", comprises intensely illuminating the tissue sample selectively in the emission wavelength range of the one or more fluorescent stains to be introduced in step 108 and/or which have already been introduced by an in-vivo staining approach. The selective photo bleaching may reduce the auto-fluorescence selectively in emission wavelength ranges of the fluorescent stains to be examined. Thus, embodiments of the invention may allow taking advantage of the increased autofluorescence (better identification of tissue sample borders) and at the same time ensuring a high signal-to-noise ratio by reducing autofluorescence selectively in those wavelength ranges which correspond to emission wavelength range of the fluorescent stains to be examined.

For example, a light source, e.g. a laser, having a power 1 Watt or more, preferably about 2 Watt, can be used. The light of the light source is applied on the sample for about 10 seconds using a filter that allows light of about 545 nm to pass through to the sample. Each sample was illuminated by the above mentioned filtered light source by a light-sheet microscope in each layer for about 10 seconds, whereby the light sheet scanned the sample in one direction.

Thanks to the increased tissue permeability induced by the delipidation solution, the staining procedure in step 108 can be performed in accordance with a simple and fast sample immersion protocol. One or more samples which have been fixed and immersed in the delipidation solution according to steps 102-104 and which have optionally undergone selective photo bleaching are immersed in one or more staining solutions. For example, the staining solution can be one or more solutions respectively comprising a directly (fluorescence) labeled primary antibodies. This may be advantageous as a smaller number of staining steps and changes of staining solution is required, thereby increasing the performance of the sample preparation workflow. It may be possible to rapidly stain a large number of tissue samples simply by immersing the samples in one or more staining solutions. It is possible that step 108 comprises the immersion of the sample in multiple different staining solutions comprising different fluorescent markers adapted to selectively bind to different biomarkers, e.g. different proteins, expressed by a cell. Thanks to the increased tissue permeability induced by the delipidation solution, the staining procedure can be performed as a simple immersion protocol that is suitable for process automation as it does not require complex sample perfusion operations. In a further beneficial aspect, the incubation time of the sample in the staining solutions is significantly shorter than in state of the art organic tissue clearing protocols thanks to the increased permeability of the swollen and delipidated tissue sample. Typically, the preparation and staining of large samples based on state of the art methods requires 1-2 weeks, whereby samples of comparable size can be prepared and stained within 4-5 days in accordance with embodiments of the invention.

Next in step 110, a further fixation of the tissue sample can optionally be performed. This step is performed for fixing the marker molecules introduced by the one or more staining solutions in step 108 in the tissue sample. It has been observed that although this extra fixation step requires additional time and thus may slightly slow down the workflow, the additional fixation step may have protect many labeled marker molecules from being washed out during the dehydration steps 112. Moreover, the additional fixation step 110 may allow applying a particularly harsh dehydration protocol in the subsequent step 112 without significantly reducing the signal strength of the fluorescent stains.

In step 112 a stepwise dehydration of the tissues is performed by immersing the tissue sample multiple times in a series of dehydration solutions, also referred herein as "washing solutions". The series of dehydration solutions may consist of a series of water-solvent mixtures having an increasing concentration of an organic solvent, e.g. ethanol, that is to replace the water in the tissue for gradually adapting the RI of the liquid tissue sample portions to the RI of the organic clearing solution. The dehydration results in a step-wise shrinkage of the tissue sample, thereby compensating the swelling of the tissue induced by the delipidation solution. When the washing steps are completed and the tissue sample comprises the maximum possible concentration of the organic dehydration solution, the shrinking of the sample will stop, thereby providing a tissue sample whose volume and/or morphology will be identical to or very similar to the volume and/or morphology of the respective tissue in the living organism from which the sample was derived.

For example, the tissue samples can be dehydrated by incubating the sample in a graded ethanol series (3 times in a 70% ethanol solution, 2 times in a 95% ethanol solution, and two times in 100% ethanol for 30 min each).

For example, the dehydration solutions 210, also referred to as "dehydration solutions", may comprise a series of solutions respectively consisting of a mixture of water and an organic solvent, e.g. ethanol. Methanol can also be used as organic component of the dehydration solutions. The decrease in fluorescence signal strength induced by the dehydration procedure was found acceptable for each of these organic compounds used in the dehydration solutions.

Alternative dehydration solutions such as tert-butanol, BuOH (butanol), THF (tetrahydrofuran) may also be used. However, they should preferably be able to induce the—typically undesired—shrinkage effect of tissue such that if combined with the delipidation solution, the morphology of the sample corresponds to the morphology of the original tissue.

Next in step 114, the tissue sample is immersed in an organic clearing solution, e.g. BABB. Preferably, the concentration of the components of the organic clearing solution, e.g. BA and BB, are chosen such that the RI of the organic clearing solution is identical to or similar to the RI that is typical for cleared tissue samples of the type of tissue from which the currently processed tissue sample was derived. The tissue sample generated by a sample processing workflow as described herein may have a greater degree of optical transparency and clarity than samples processed with state of the art approaches. Moreover, said samples will have a volume and morphology that faithfully reproduces the volume and morphology of the original tissue in the living organism. Furthermore, the processing of the sample may require less time and manual interaction than current organic sample processing workflows.

For example, the dehydrated tissue sample can be placed in an organic solvent solution consisting of one part benzyl alcohol and two parts benzyl benzoate (BABB, Sigma-Aldrich) and incubated for at least two days at 4° C. in the dark. However, the duration may strongly depend on the shape and size of the tissue sample. Very large, compact tissue samples may require more than 24 hours, smaller samples may require only 12 hours or less.

Next in step 116, the cleared tissue sample is analyzed by an optical sample analysis method, e.g. a 3D light sheet fluorescence microscope. The images obtained by this microscope or other type of optical sample analysis device are processed in an image processing workflow and used for generating and displaying a 3D model of sub-structures of the tissue sample. In particular, the 3D visualization may be employed for 3D visualization of one or more target structures or target cell populations which were selectively labeled and stained by a marker-specific stain, and/or a nuclear-specific stain, and/or an in-vivo stain.

For example, the optical transparent tissue sample can be placed into a sample holder, transferred into the imaging chamber and scanned three-dimensionality with a commercial available light-sheet microscope (e.g. from LaVision BioTec). Compared to existing light-sheet geometries, BTLSFM uses a double-side illumination of six focused laser light-sheets, three from each side, for a homogeneous in-focus plane illumination of large optical transparent specimen from several millimeters up to centimeter size. This geometry reduces light scattering and photo bleaching from out-of-focus regions to a minimum and enables very fast and stitching-free data acquisition. The emitted fluorescence light is detected perpendicular to the collimated laser beam by a sCMOS camera providing high sensitivity and resolution in combination with a large field-of-view (pixel: 2560×2160). By stepping the transparent tissue sample vertical through the collimated light-sheet, optical sectioning is performed and the obtained z-stack of virtual tissue slices are used for two- and three-dimensional tissue analysis down to cellular resolution. The illumination geometry together with the large field-of-view camera enables a fast and stitching-free measurement of large optical transparent tissue samples in xy-direction down to six millimeters in depth (z-direction).

Overview scans as well as high-resolution scans with an overall magnification of 10× (xy-resolution: 0.6 µm) can be performed to receive detailed tissue information at single cell resolution. Tissue autofluorescence (Ex: 543/22 nm; Em: 593/40 nm) and fluorescence signals from various fluorescent stains applied in the staining step(s) can be imaged for the optical transparent tissue samples. Thereafter, the generated image data were converted into Digital Imaging and Communications in Medicine (DICOM) files and visualized using existing software solutions, e.g. OsiriX software (Pixmeo, Bernex, Switzerland; open-source software). In addition, or alternatively, ImageJ (open-source software) and GNU Image Manipulation Program (GIMP, open-source software) can be used for 3D imaging.

Figure 2:
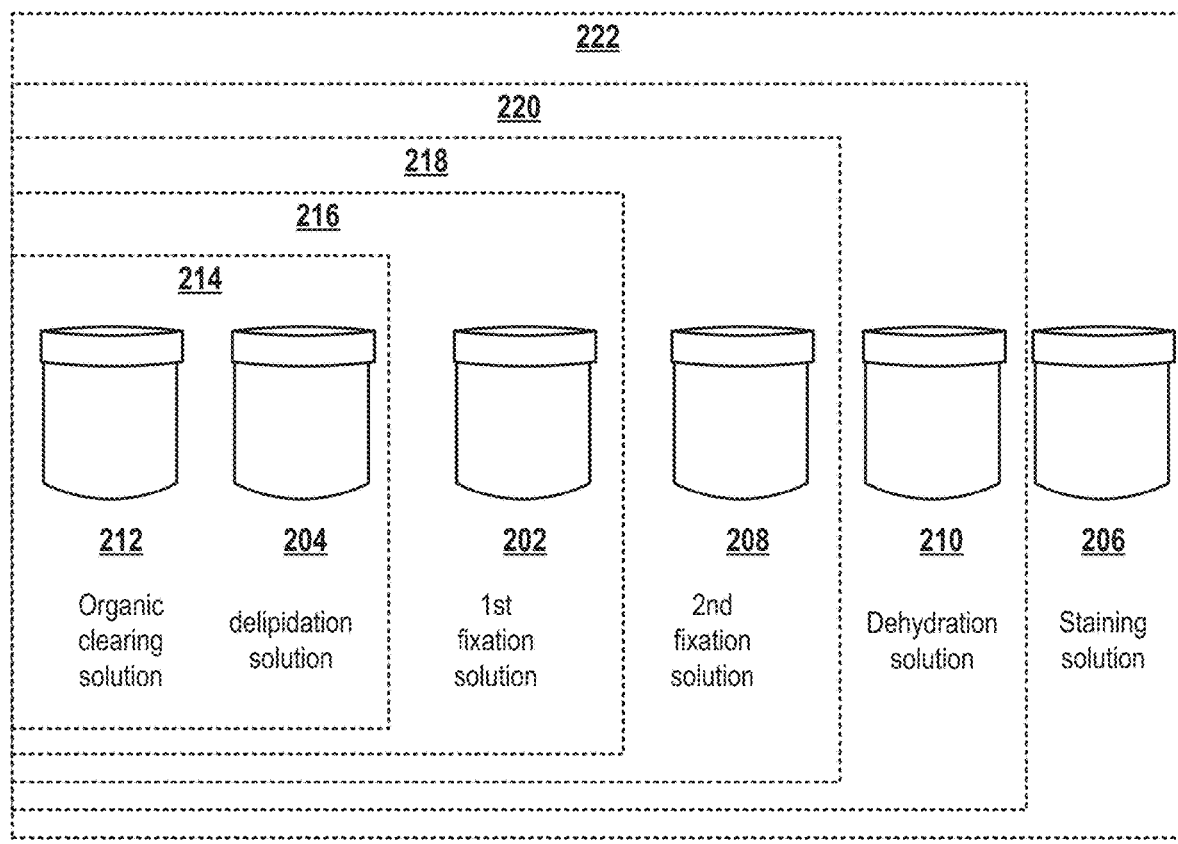
FIG. 2 shows various kits for use in the method of FIG. 1

FIG. 2 shows various kits for use in the method of FIG. 1. for example, a "minimalistic kit 214" may merely consist of the delipidation solution 204 and an organic clearing solution 212. Other kits 216, 218, 220, 222 may comprise one or more additional solutions, e.g. a first fixation solution 202, a second fixation solution 208, one or more dehydration solutions 210 and/or one or more staining solutions 206.

For example, the delipidation solution 204 can be a 10× PBS buffer comprising about 10% (by volume) the chaotropic agent urea, 20-25% Quadrol, 5% Tween-80, 5% TEA, and 5% DMSO. The solution 204 can in addition comprise a dye, e.g. propidium iodide and/or an antimicrobial agent.

The staining solutions 206 may comprise one or more fluorescent markers, e.g. quantum dots or antibodies, but also auxiliary solutions like peroxidase solutions which may be required in some particular visualization systems.

According to some embodiments, the kit is provided as a "research kit" and/or as "clinical" kit. The design and size of the bottles of the "research kit" may be adapted for use in the context of a research laboratory or in any other laboratory where a limited amount of tissue samples shall be cleared in a manually executed or only partially automated workflow. The design and size of the bottles of the "clinical kit" may be adapted for use in the context of large pre-clinical, clinical and diagnostic laboratories where a large amount of tissue samples shall be cleared in a fully automated or semi-automated workflow. For example, the design of the bottles of the "clinical kit" may allow inserting the bottles in respective slots of an automated sample preprocessing and clearing system as depicted, for example, in FIGS. 3A and 3B.

Figure 3A:
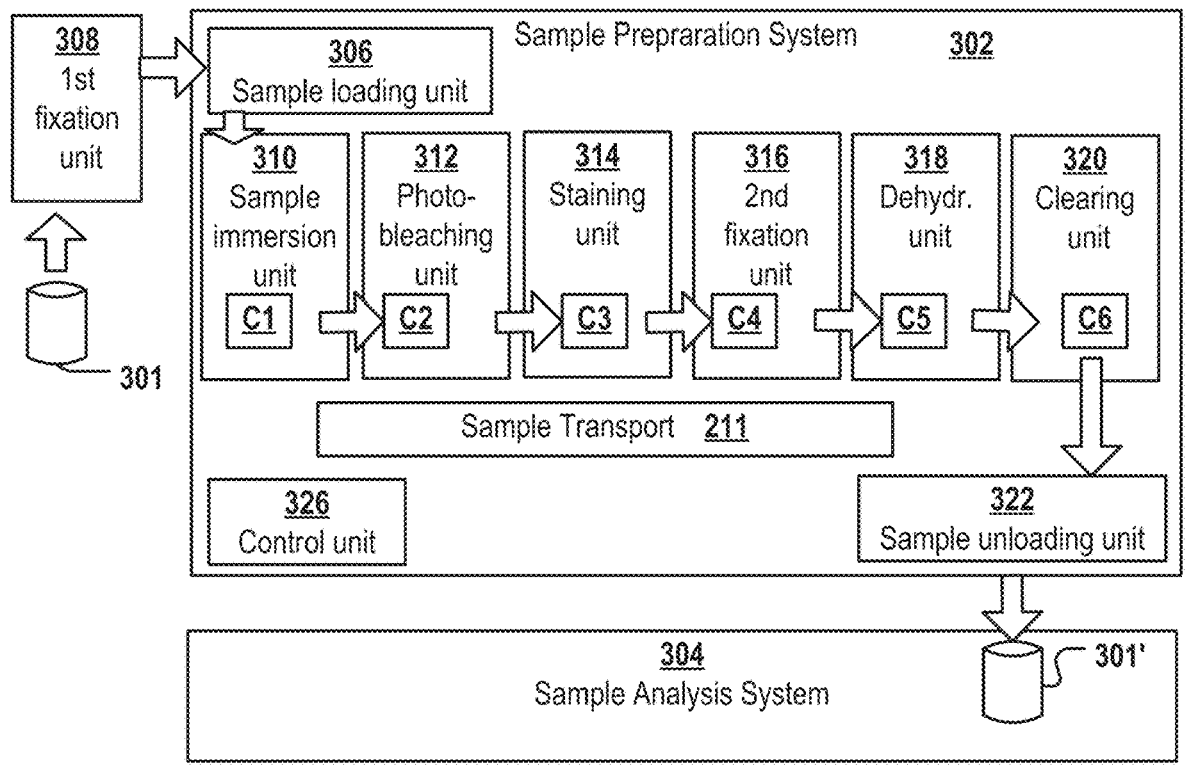
FIGS. 3A and 3B show two sample preparation systems configured for automatically or semi-automatically preparing a tissue sample.

FIG. 3A shows a sample preparation system 302 configured for automatically or semi-automatically preparing a tissue sample in accordance with a sample preparation method described herein for embodiments of the invention. The sample preparation system can be a monolithic device comprising each of the units 310, 312, 314, 316, 318, 320, 326, 306, 322 and optionally also 308 is integral device components. Alternatively, the sample preparation system can be a distributed, modular system, wherein one or more of the above mentioned units correspond to separate apparatus or devices. The transport of the samples from one unit to the next can be performed fully automatically by a conveyor belt and/or robotic arm, or manually by a human user. The transport may also be implemented semi-automatically such that human intervention is required only for one or more transport or other workflow steps while the majority of workflow steps is performed automatically. The sample preparation system 302 can comprise or be operatively coupled to a control unit 320, e.g. a control computer or an embedded device having e.g. the form of a microchip.

A user may immerse one or more tissue samples 301 in a first fixation solution 202 for generating a fixed tissue sample that is manually or automatically transported from a first fixation unit 308 where the first fixation takes place to a loading unit 306 of the sample preparation system. As mentioned in the paragraph above, in some alternative embodiments, the first fixation unit 308 can be an integral part of the sample preparation system 302.

The sample preparation system 302 receives the one or more fixed samples via sample loading unit 306 and immerses the sample in a first sample container C1 of the sample immersed in unit 310. Container C1 comprises a delipidation solution 204. The controller 326 causes the sample immersion unit 310 to immerse the one or more samples in the delipidation solution as described herein for embodiments of the invention, e.g. as described in the description of FIG. 1, step 104.

The photo bleaching unit 312 is an optional component. The control unit may be configured to send a command to the sample transport unit 211, e.g. a conveyor belt and/or one or more robotic arms, adapted to cause the transport unit to transport the one or more tissue samples from sample immersion unit 310 to a container C2 in the photo bleaching unit 312. Alternatively, the photo bleaching unit can be an integral part of the sample immersion unit or the staining unit 314 and is adapted to perform the photo bleaching on the one or more samples contained in container C1 or C3. The control unit may be adapted to send a command to the photo bleaching unit for performing photo bleaching of the one or more samples as described herein for embodiments of the invention, e.g. as described in the description of FIG. 1, step 106.

The control unit may further be configured to send a command to the sample transport unit 211 for transporting the one or more tissue samples from sample immersion unit 310 or from the photo bleaching unit 312, if any, to a container C3 in the staining unit 314. The container C3 may consist of one or more containers respectively comprising staining solutions or solutions required in a staining protocol 206. The control unit may be adapted to send a command to the staining unit for staining the one or more samples with one or more stains, in particular fluorescent stains, as described herein for embodiments of the invention, e.g. as described in the description of FIG. 1, step 108, e.g. by immersing the samples in the respective staining solutions for a predefined time and then exchanging the staining solutions or subsequently putting the samples into different containers C3 comprising different staining solutions.

The control unit may further be configured to send a command to the sample transport unit 211 for transporting the one or more tissue samples from the staining unit to a container C4 in an optional second fixation unit 314. The container C4 may comprise a second fixation solution 208 adapted for fixing the markers applied in the staining unit 314 in the tissue sample. The control unit may be adapted to send a command to the second fixation unit 316 for immersing the one or more samples in the second fixation solution as described herein for embodiments of the invention, e.g. as described in the description of FIG. 1, step 110.

The control unit may further be configured to send a command to the sample transport unit 211 for transporting the one or more tissue samples from the second fixation unit 316, if any, or from the staining unit 314, to one or more containers C5 in a dehydration unit 318. The container(s) C5 may comprise one or more dehydration solutions 210, e.g. mixtures of water and ethanol. The control unit may be adapted to send a command to the dehydration unit for immersing the one or more samples in the multiple dehydration solutions such that the sample is first immersed in a dehydration solution with a comparatively low content of the organic solvent (e.g. 70% ethanol, 95% ethanol and 100% ethanol), then in one or more further washings solutions having an increased content of the organic solvent, and then finally in a washings solution that comprises a high content of the organic solvent, e.g. 100% of ethanol. The washing of the samples can be performed as described herein for embodiments of the invention, e.g. as described in the description of FIG. 1, step 110.

The control unit may further be configured to send a command to the sample transport unit 211 for transporting the one or more tissue samples from the dehydration unit to a container C6 in a clearing unit 314. The container C6 may comprise an organic clearing solution 212, e.g. BABB whose composition is preferably adapted such that the RI of the organic clearing solution is identical to or very similar to the RI of a washed tissue sample of a particular tissue type. For example, the container C6 can be an immersion chamber of a microscope or a carrier container enabling the user to carry the cleared sample to a microscope and insert it in the immersion chamber of the microscope. The control unit may be adapted to send a command to the clearing unit 320 for immersing the one or more samples in the organic clearing solution as described herein for embodiments of the invention, e.g. as described in the description of FIG. 1, step 114. The system may further comprise bottles with reagents and solutions as depicted in FIG. 2 and various pumps controlled by the controller for pumping the solutions into respective containers in a coordinated way.

The sample preparation system can be used for providing cleared tissue samples 301' that can be analyzed in one or more sample analysis systems 304, in particular optical analysis systems, e.g. light sheet microscopes, Raman spectrometers, and the like. The samples 301' may be transported automatically by the sample transport unit or manually by a user to the sample analysis system.

Figure 3B:
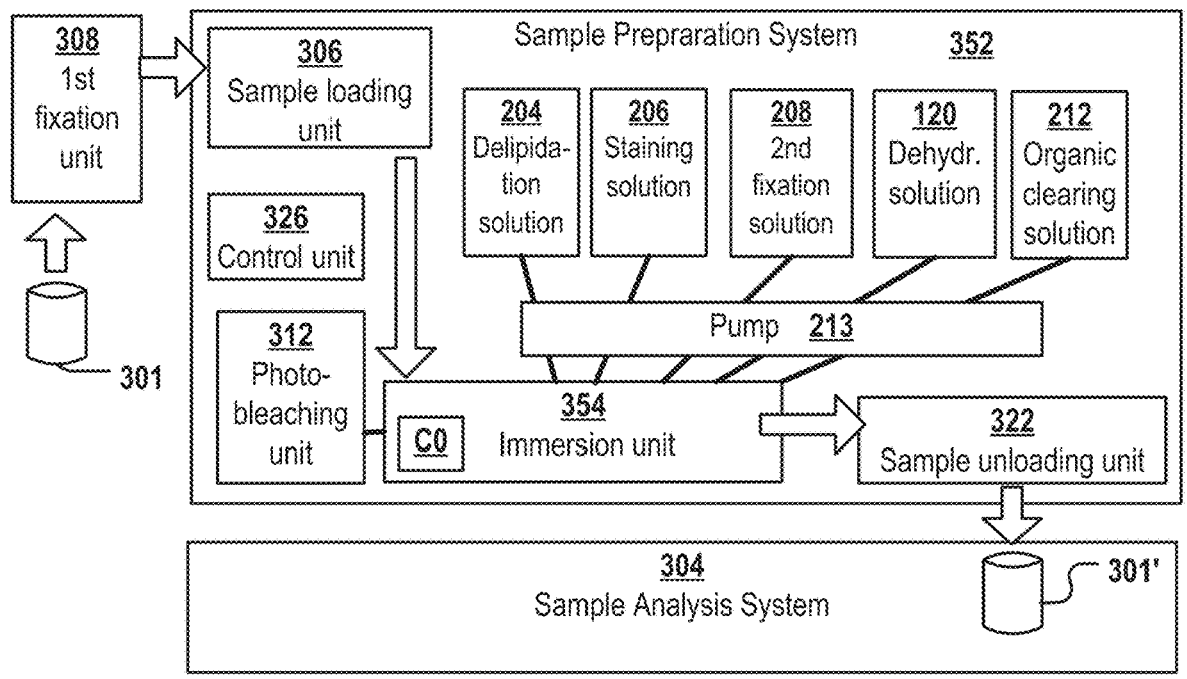

FIG. 3B depicts an alternative embodiment of a sample preparation system 352.

The system 352 comprises a fewer number of sample containers then the system depicted in FIG. 3a. For example, the system 352 may comprise a single sample container C0 of a single immersion unit 354. The immersion unit is operatively coupled via one or more pumps 213 to a delipidation solution 204, one or more staining solutions 206, one or more dehydration solutions 120, an organic clearing solution 212 and optionally also to a first fixation solution 202 and/or a second fixation solution 208. The control unit 326 is adapted to coordinate the pumps 213 such that the one or more tissue samples 301 which are loaded from the loading unit 306 into the container C0 of the immersion unit are immersed in the solutions 204, 206, 208, 120, 212 in accordance with the sample preparation method described herein for embodiments of the invention. For example, the control unit may start and stop the one or more pumps 213, open or close valves of respective reagent bottles 204-212 such that e.g. at first the container C0 with the samples is filled with the delipidation solution, then the delipidation solution is removed and replaced by one or more staining solutions, a second fixation solution, a series of dehydration solutions and finally an organic clearing solution until organically cleared samples 301' are obtained and unloaded from the sample preparation system 352 to the sample analysis system 304.

While the embodiment depicted in FIG. 3A is based on a combination of multiple different containers for different solutions and transport means adapted to transport the tissue samples from one container to another, the embodiment depicted in FIG. 3B is based on a coordinated control of pumps and valves connected to multiple reagent bottles such that the one or more tissue samples contained in a single container C0 is subsequently immersed in different solutions because the solutions are exchanged after predefined immersion time intervals.

Sample preparation systems according to further embodiments make comprise a mixture of the two basic concepts illustrated in FIGS. 3A and 3B. For example, these embodiments may comprise more than one single container and more than a single immersion unit and comprise a transport mechanism for transporting the samples from one of these containers to the other. However, these embodiments may in addition comprise a control unit configured to coordinate pumps and valves connected to at least some of the reagent bottles such that the solution the samples are currently immersed in is exchanged by another solution without transporting the samples to a different container.

Almost all currently available tissue clearing procedures use time- and labor-intensive whole animal perfusion to reduce the influence of light absorbance of blood in organs and tissue components. To the contrary, embodiments of the invention provide for a perfusion-free clearing protocol which is adapted to speed up tissue clearing and enable the accomplishment of large animal studies, which is a prerequisite for pharma research that heavily relies on automated sample processing systems as depicted in FIGS. 3A and 3B. On the basis of standard histological tissue processing (formalin fixation & ethanol dehydration) and an already existing organic solvent-based clearing method (BABB), embodiments of the invention provide for an improved a clearing protocol which can be integrated into a conventional histology workflow in an automated or semi-automated manner. The tissue clearing protocol according to embodiments of the invention is easy to perform and enables perfusion-free, quick, automated, safe, and convenient tissue processing, e.g. in a vacuum and/or pressure operating tissue preparation system.

In some embodiments, the step of immersing the sample in the organic clearing solution is performed manually outside of the automated system, because some organic clearings solutions are highly corrosive against most plastic components. However, in preferred embodiments, the organic clearing solution is BABB or an organic clearing solution with similar optical properties that allow immersing the samples at room temperature in an automated sample processing workflow. According to embodiments, the completely dehydrated sample is automatically transferred into a mobile, transportable container comprising the organic clearing solution, e.g. an corrosion-resistant container comprising a BABB solution (which may be part of the kit).

According to some embodiments, the sample preparation system can comprise one or more vacuum and pressure operating tissue processors (such as e.g. Tissue Tek® VIP, Sakura 311 Finetek) or functionally equivalent devices or device components, enabling fast, automated and high-throughput processing under standardized conditions.

Figure 4:
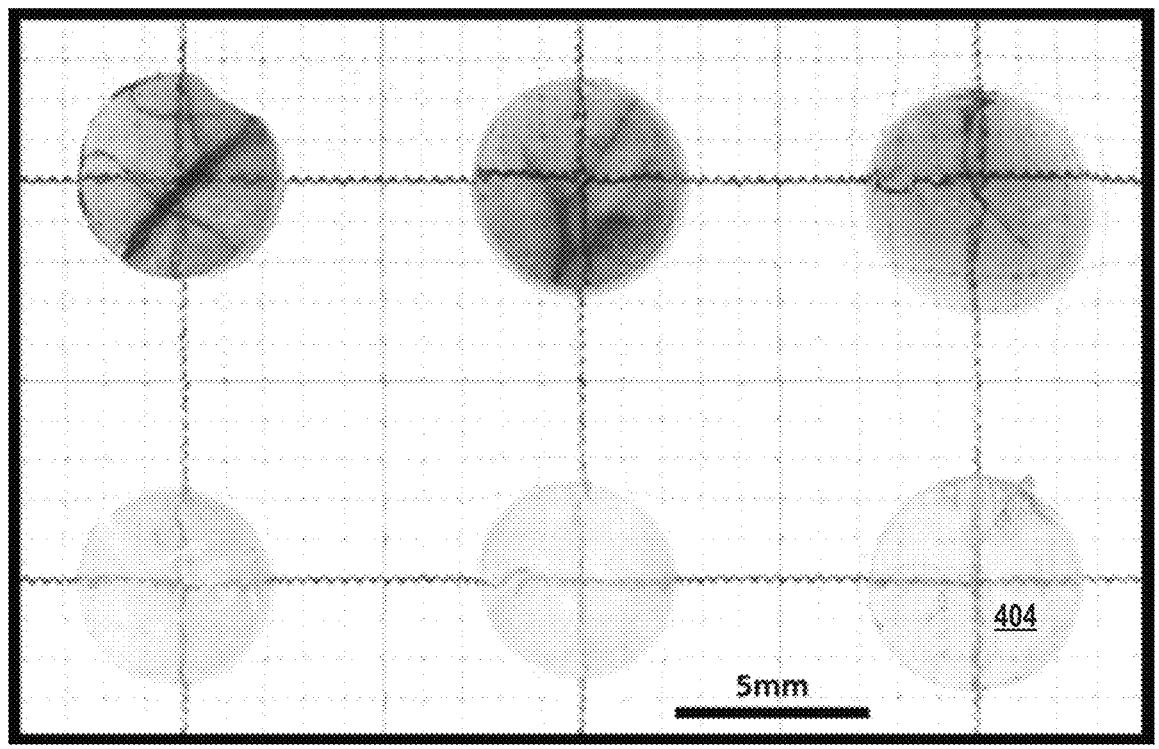
FIG. 4 shows a comparison of tissue samples cleared with a conventional clearing protocol and tissue samples cleared with a method according to embodiments of the invention.

FIG. 4 shows a comparison of tissue samples cleared with a conventional organic clearing protocol and tissue samples cleared with a method according to embodiments of the invention.

Liver lobes were dissected and immersed in a strong fixation solution with 4% paraformaldehyde (PFA) for 24 h at 4° C. Then, the fixed tissue samples were immersed in a buffer (phosphate buffered saline containing the preservative ProClin300, $PBS_{PC}$) and stored at 4° C. until further processing. Then, biopsies were taken from the lobes and used as tissue samples. The tissue samples were subjected to different sample preparation protocols.

The three tissue samples depicted in the upper row of FIG. 4 illustrate the optical transparency of standardized murine liver samples treated in accordance with a state-of-the art organic tissue clearing protocol.

The three tissue samples depicted in the lower row of FIG. 4 illustrate the optical transparency of standardized murine liver samples treated in accordance with the tissue preparation protocol according to embodiments of the invention. The tissue samples were immersed in a water-based clearing solution known as "CUBIC-1" that was used as delipidation solution, followed by the same state-of-the art fast-BABB tissue clearing protocol that was used for generating the cleared samples depicted in the upper row of FIG. 4. As can be easily derive from a comparison of the upper and the lower row, immersing tissue samples in a delipidation solution before the actual organic clearing protocol is started significantly increases the optical clarity. Moreover, a comparison of images of the original and the cleared tissue samples (not shown) indicate that the tissue morphology is preserved better in case the samples are immersed in a delipidation solution before the samples are cleared according to an organic-solution based clearing protocol.

Figure 5:
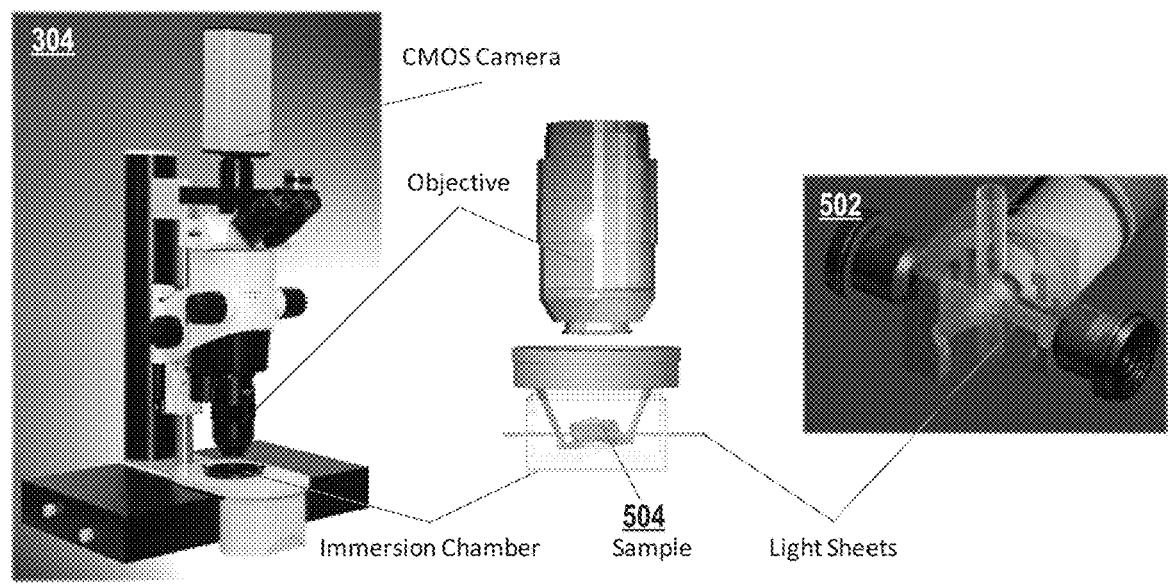
FIG. 5 shows a light-sheet microscope and an immersion chamber with a sample.

FIG. 5 shows a light-sheet microscope 304 and an immersion chamber with a sample 504. The light-sheet generating illumination source 502 of the microscope 304 is depicted in greater detail. The microscope may move the light sheet upwards and/or downwards in vertical direction and may further be adapted to move two other light sheets in two other directions such that a 3D coordinate system can be filled with signals emitted by the fluorescent stains which have selectively bound to specific cells or biomarkers in the tissue sample.

Figure 6:
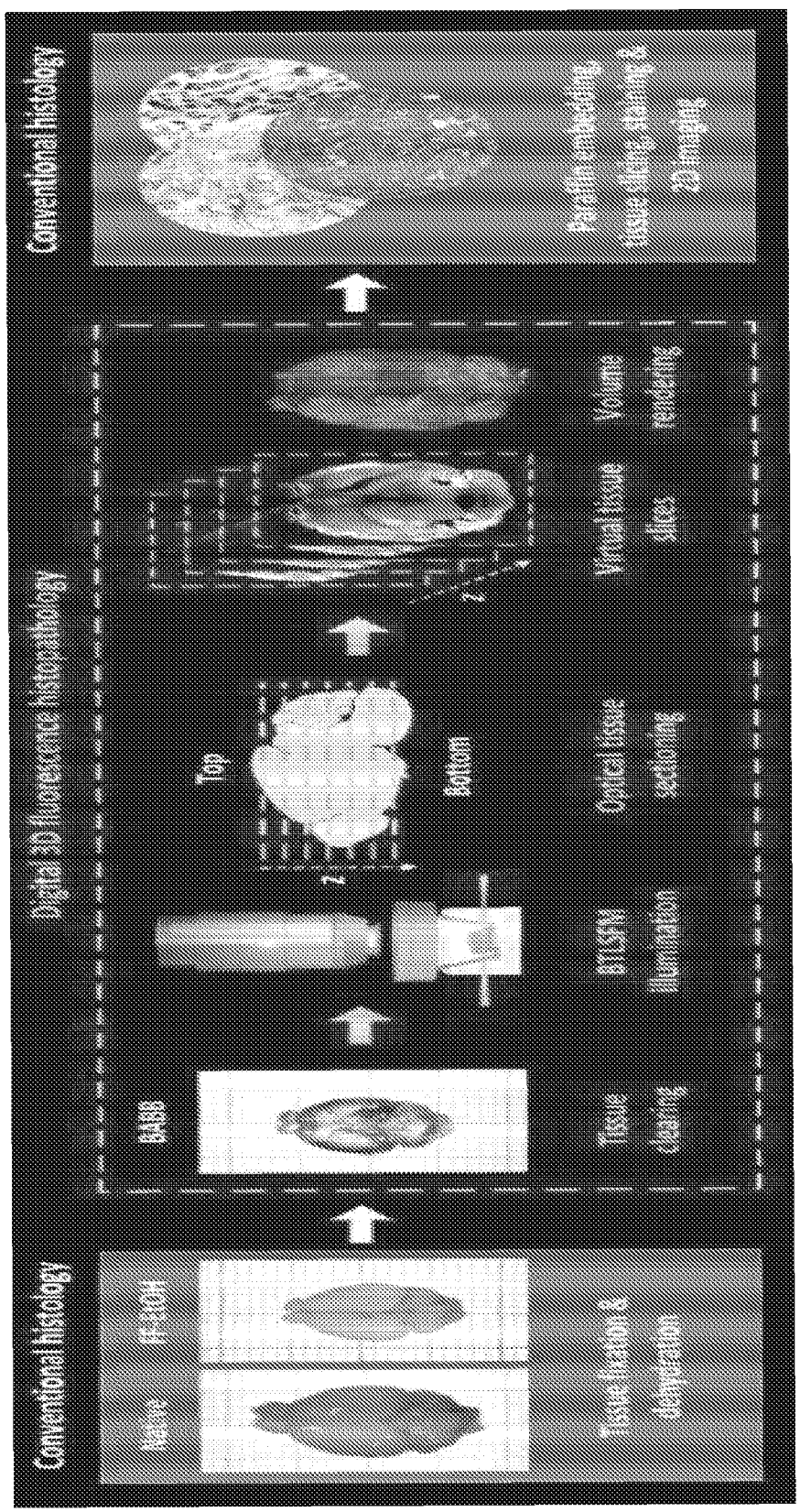
FIG. 6 shows a 3D fluorescence histopathology workflow.

FIG. 6 shows the integration of a digital 3D fluorescence histopathology workflow into the workflow of conventional histology ("FF": formalin fixation, "EtOH"; ethanol, "BABB": benzyl alcohol benzyl benzoate). The "tissue clearing" step is preferably performed based on a clearing protocol comprising the immersion of the sample in a delipidation solution and in an organic clearing solution. The immersion in an organic clearing solution is always preceded by a series of washing steps in a solution comprising a growing amount of an organic solvent such as alcohol to ensure that the RI of the liquid parts of the sample is identical to or similar to the RI of the clearing solution used for analyzing the image and to ensure that no schlieren are generated during analysis resulting from a mixing of tissue water and the organic solvent.

Figure 7:
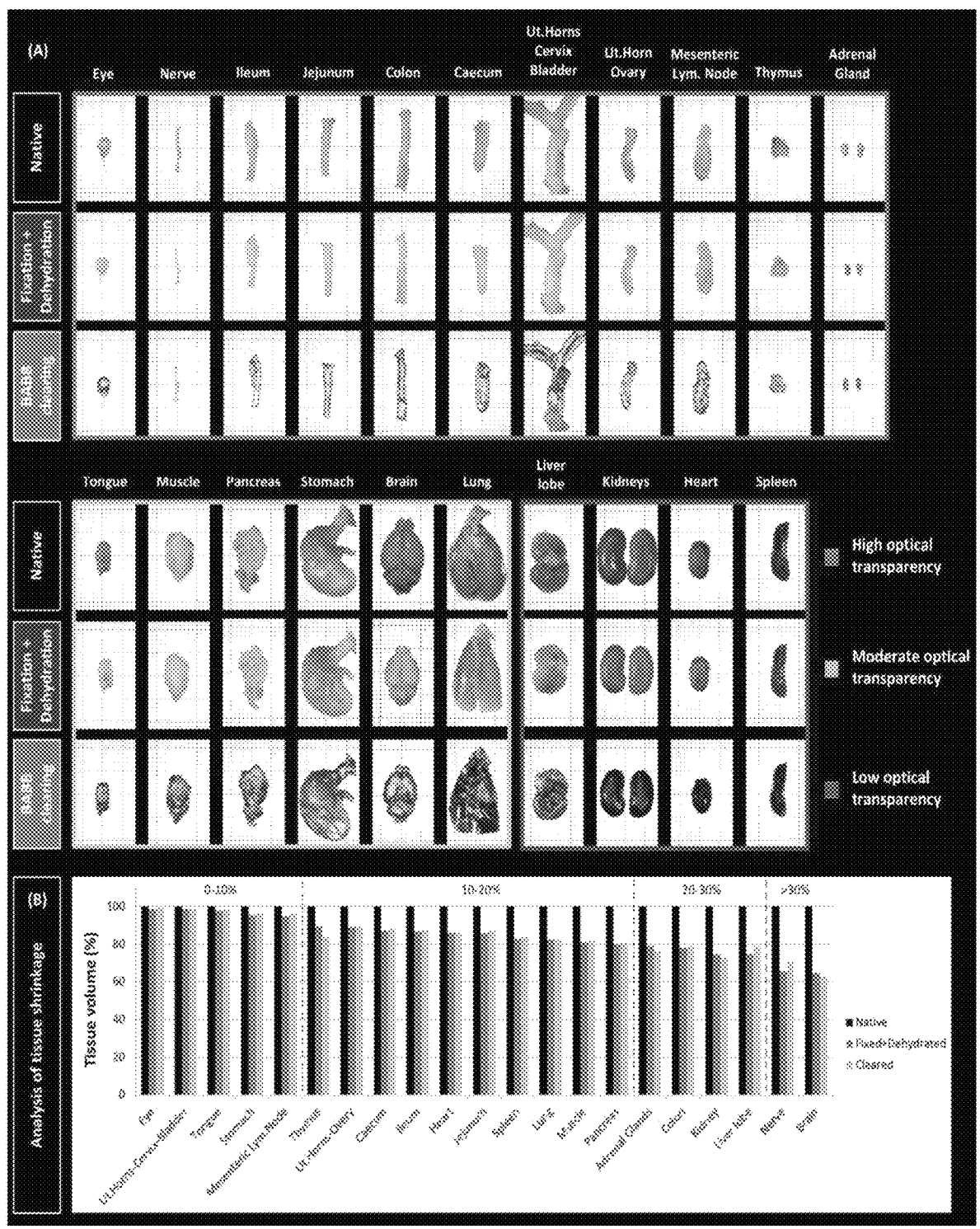
FIG. 7 shows various types of murine tissue samples at different stages of an organic clearing protocol lacking an immersion in a delipidation solution.

FIG. 7 shows various types of murine tissue samples at different stages of a clearing protocol solely comprising an organic dehydration and clearing step but not a step of immersing the sample in a delipidation solution. The figure illustrates the influence of formalin-based tissue fixation and dehydration on tissue integrity and optical transparency. The size of the explanted mouse organs and tissue samples was determined at each stage of the tissue processing protocol (not all of which are depicted). Incubating the sample in the first fixation solution and in particular in the washing (dehydration) solutions induces a significant shrinkage of the tissue in almost all investigated organs. Especially neural tissues, such as the brain and sciatic nerve, exhibited remarkable size reduction compared to the native state (>30% reduction). This shrinkage effect was visible for almost all organs and tissue types, ranging from 1.5 up to 30% size reduction. FIG. 7A depicts different mouse organs and tissues having been subjected to an organic clearing protocol that does not comprise an incubation in the delipidation solution. Based on resulting optical transparency the individual tissue types were divided into three groups: (I) high optical transparency (green mark), (II) moderate optical transparency (yellow mark), and (III) low optical transparency (red mark). FIG. 7B depicts an analysis of tissue shrinkage of different tissue types.

Figure 8:
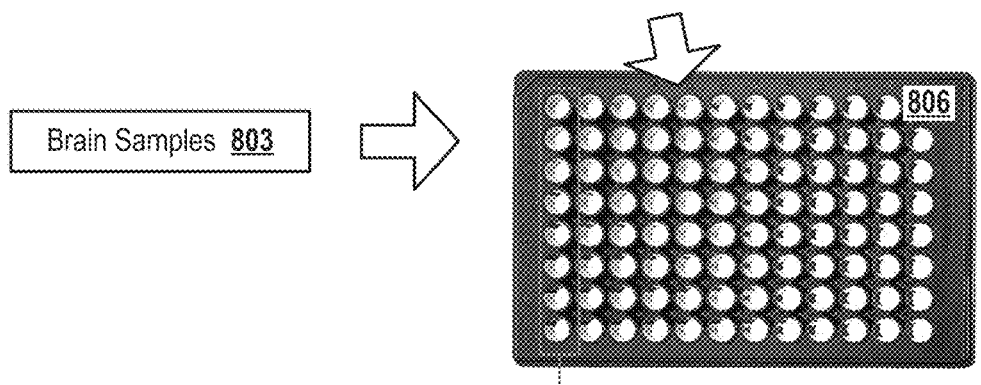
FIG. 8 illustrates the tissue clearing effect obtained when using various delipidation solutions.
Figure 8:
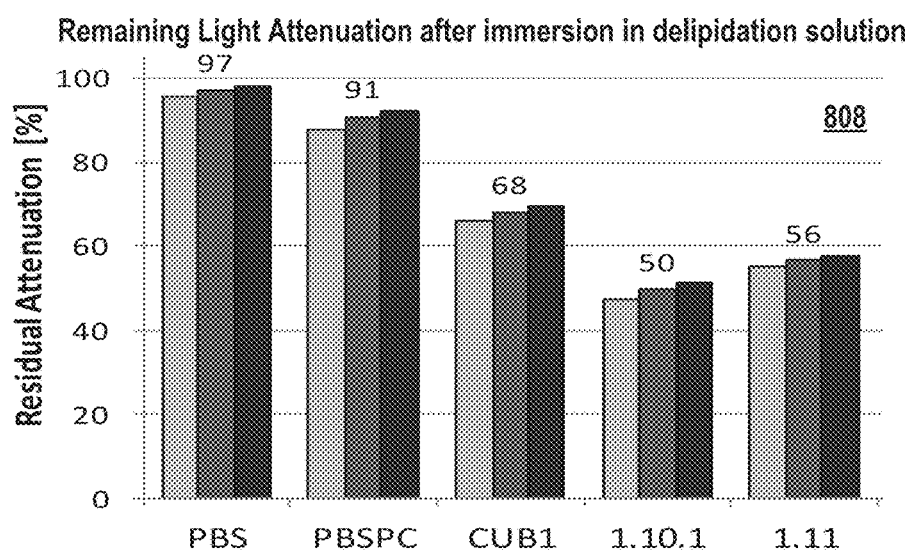

FIG. 8 illustrates the tissue clearing effect obtained when applying various delipidation solutions listed in table 802 on mouse brain tissue samples 803 in a 96 well plate 806. The brain tissue samples were immersed in a strong fixation solution with 4% paraformaldehyde (PFA) for 48 h at 4° C. Then, the fixed tissue samples were immersed in a buffer (PBS) and stored at 4° C. until further processing. Then, the brain samples were transferred onto a clear-bottom 96 well plate and light attenuation of the samples resulting from scattering and absorbance were measured for different wave lengths (550, 630, 740 nm) to obtain an "original attenuation".

Then, all samples were transferred to falkon tubes for immersing the samples in the delipidation solution. All samples in the same column of the well were immersed in the same delipidation solution for 12-24 h. Some of the delipidation solutions tested were water-based clearing solutions known in the art, e.g. CUBIC-1 variants. Then, the samples were washed thoroughly 5×5 minutes to remove all delipidation solution and were immersed in the same buffer (e.g. PBS) used for measuring the "original attenuation". Then, the samples are transferred back on the 96 well plate and light attenuation of the samples was measured.

Average signal decrease in three different wave lengths (550, 630 and 740) was measured. The results are illustrated in bar plot 808. It was observed that the delipidation solutions "1.10.1" and "1.11" provided the best results in respect to optical clarity of the tissue. Thus, according to embodiments, the delipidation agent can be, for example, delipidation solution "1.10.1" or delipidation solution "1.11". "CUB1" may also be used as delipidation agent, although the optical clarity of the finally obtained tissue sample may be lower compared to the other two delipidation solutions.

Figure 9A:
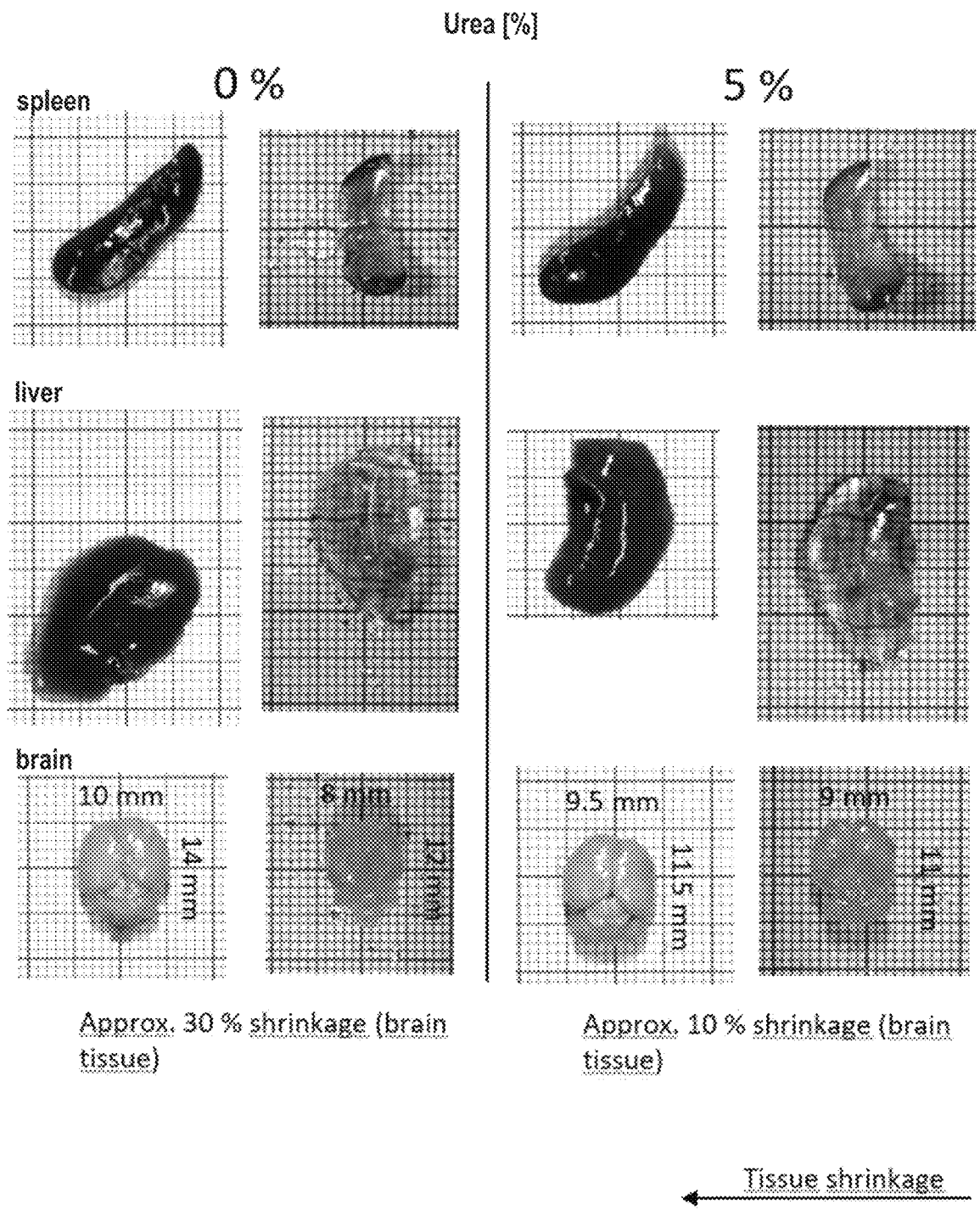
FIGS. 9A and 9B show photos of a plurality of fresh, unperfused tissue samples and photos of the said samples after immersion in both a water-based and an organic-solvent based clearing solution, whereby the water-based clearing solution has varying concentration of the chaotropic agent urea.

FIG. 9A shows six pairs of photos of whole-organ mouse tissue samples organized in two columns and three rows. The first row corresponds to spleen tissue, the second row corresponds to liver tissue and the lowest row corresponds to brain tissue. The first column "0%" and the second column "5%" respectively comprise three pairs of photos of tissue samples, whereby the left image of each pair depicts a fresh, unperfused tissue sample and the right image of the pair depicts the said tissue sample after immersion in both a water-based delipidation solution and an organic clearing solution. The water-based delipidation solution acts as a water-based clearing solution. The water-based delipidation solution DLS0 used for obtaining the cleared tissue samples in the first ("0%") column is free of the chaotropic agent urea. The water-based delipidation solution DLS5 used for obtaining the cleared tissue samples in the second ("5%") column comprises 5% (by volume) the chaotropic agent urea.

For example, the water-based delipidation solutions DLS0 may consist of water based solvent comprising the following components:
- 20% by volume Quadrol,
- 5% by volume Tween-80,
- 5% triethanol amine (TEA),
- 5% dimethylsulfoxid (DMSO),
- about 3 µg propidium iodide per ml.

For example, the water-based solvent can be pure water. Alternatively, the water-based solvent can be 1× PBS (phosphate-buffered saline) or 10× PBS or a PBS buffer of a different concentration. PBS is a buffer solution commonly used in biological research. It is a water-based salt solution containing disodium hydrogen phosphate, sodium chloride and, in some formulations, potassium chloride and potassium dihydrogen phosphate. The buffer helps to maintain a constant pH. The osmolarity and ion concentrations of the solutions preferably match those of the tissue samples (isotonic).

For example, 10× PBS is water comprising NaCl (58.44 g mol$^{-1}$), KCl (74.55 g mol$^{-1}$), Na2HPO4 (141.96 g mol$^{-1}$) and KH2PO4 (136.09 g mol$^{-1}$).

The water-based delipidation solutions DLS5 may differ from DLS0 only in that it in addition comprises 5% by volume the chaotropic agent urea.

The image shows that if the delipidation solution lacks the chaotropic agent or comprises only a small amount of the chaotropic agent, the tissue shrinkage caused by the organic solution BABB results in a significant shrinkage and distortion of the tissue samples. The effect is particularly prominent for brain tissue where the BABB solution and the washing with an organic solvent resulted in a 30% volume shrinkage of the brain sample that was not compensated by any chaotropic agent if the DLS0 was used (first column of FIG. 9A). The BABB-induced shrinkage effect could at least partially be compensated when applying DLS5 instead of DLS0, because the 5% urea contained in the DLS5 solution resulted in a net tissue volume shrinkage effect of only 10% rather than 30% (second column of FIG. 9A).

Applicant observed in a further test series on brain, liver and spleen tissues (not shown) that an alternative DLS0 solution whose composition is given below basically had the same effect on the tissue samples in combination with BABB. The alternative DLS0 solution consist of water based solvent comprising the following components:
- 25% by volume Quadrol,
- 5% by volume Tween-80,
- 5% triethanol amine (TEA),
- 5% dimethylsulfoxid (DMSO),
- about 3 µg propidium iodide per ml.

The higher amount of quadrol resulted in a slightly better clearing of liver and spleen tissues having a high hemoglobin concentration.

Figure 9B:
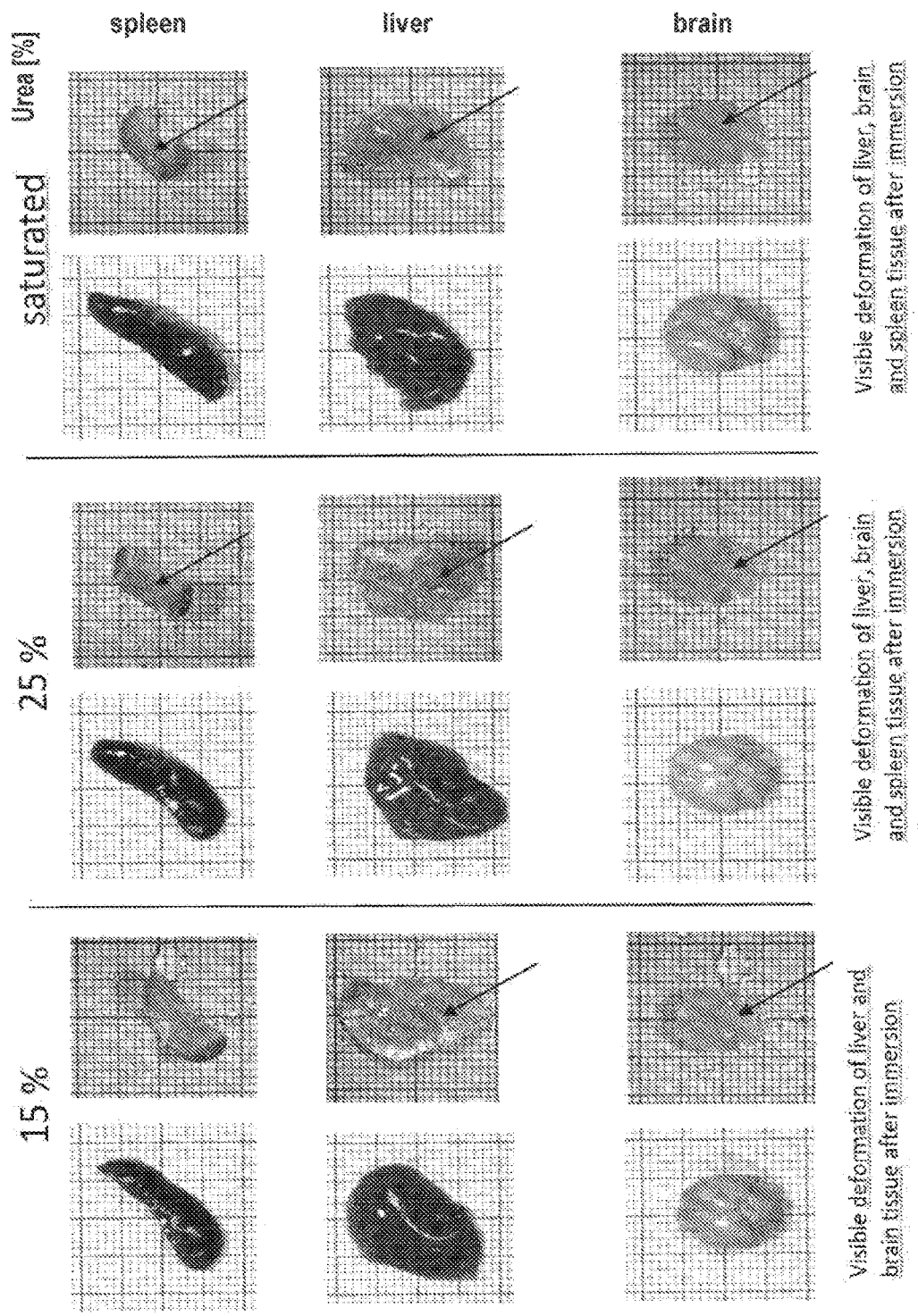

FIG. 9B shows 9 pairs of photos of whole-organ mouse tissue samples organized in three columns and three rows. Like in FIG. 9A, the first row corresponds to spleen tissue, the second row corresponds to liver tissue and the lowest row corresponds to brain tissue. The first column "15%", the second column "25%" and the third column "saturated" respectively comprise three pairs of photos of tissue samples, whereby the left image of each pair depicts a fresh, unperfused tissue sample and the right image of the pair depicts the said tissue sample after immersion in both a water-based delipidation solution and an organic clearing solution. The water-based delipidation solution DLS15 used for obtaining the cleared tissue samples in the first ("15%") column comprises 15% (by volume) the chaotropic agent urea. The water-based delipidation solution DLS25 used for obtaining the cleared tissue samples in the second ("25%") column comprises 25% (by volume) the chaotropic agent urea. The water-based delipidation solution DLS5 used for obtaining the cleared tissue samples in the second ("saturated") is a water-based solution saturated with the chaotropic agent urea.

The image shows that the DLS15 was able to compensate the tissue shrinkage caused by the organic solution BABB. The liver and brain tissue show some slight deformation but basically the structure and size of the original tissue samples was maintained.

Immersing a tissue sample in a DLS25 solution (i.e., a DLS0 solution comprising 25% urea by volume) at first resulted in a significant swelling of the sample (not shown). The swelling of the tissue makes the tissue sample highly permeable to other solvents and results in a disruption of some extra- and/or intra-cellular structures that provide structural stability to the sample. Washing and immersing a sample that was previously treated with DLS25 therefore resulted in a significant net shrinkage and distortion of the tissue morphology (right images in the second, "25%" column).

Immersing a tissue sample in a DLS5 solution (i.e., a DLS0 solution saturated with urea) at first resulted in a significant swelling of the sample (not shown). The swelling results in a structural destabilization of the sample. Washing and immersing a sample that was previously treated with DLS5 therefore resulted in a strong net shrinkage and distortion of the tissue morphology for all examined tissue types (right images in the third, "saturated" column).

The image pairs of FIG. 9A illustrate that an urea concentration of at least 5% is required in order to compensate for the BABB/dehydration-induced shrinkage effect.

The image pairs of FIG. 9B illustrate that, if the amount of chaotropic agent is chosen too high, the swelling effect and the BABB-induced shrinkage effect may not simply compensate each other. Rather, the strong swelling may destroy cellular and sub-cellular structures and render the tissue sample even more sensitive to BABB/dehydration-induced shrinkage. However, in a defined concentration range of the chaotropic agent, e.g. 5%-15% for urea and thio-urea, the swelling effect induced by the chaotropic agent exactly compensates the shrinkage effect of the organic-clearing solution, e.g. BABB, and further increases tissue transparency by facilitating perfusion of the tissue with all kinds of clearing agents and detergents.

In order to obtain the tissue samples depicted in the right image of each pair, untreated tissue sample respectively depicted in the left image of each pair were processed in accordance with the following sample processing procedure: the tissue sample is fixed by immersing the sample in a fixation solution for about 22 hours at 4° C. The fixation solution can be, for example, 4% paraformaldehyde (PFA). Then, each sample is rinsed in PBS twice and immersed for 10 days in one of the following water-based delipidation solutions: DLS0, DLS5, DLS15, DLS25, DLS5 with slow overhead rotation. Then, the sample is rinsed with water and transferred to a PBS or PBST (PBS with Tween, e.g. Tween-20) solution comprising 0.5% ProClin (or a similar antimicrobial agent). The sample is immersed in the PBST-ProClin solution with slow overhead rotation in the dart at room temperature for about 16 hours. The sample is then transferred into a PBS or PBST solution comprising 0.1% ProClin. Then, the samples are transferred into a 100% ethanol. The transfer can involve a stepwise transfer of the sample e.g. into 70% ethanol, then into 90% ethanol and finally into 100% ethanol in order to remove water. Finally the sample is immersed in an organic clearing solution like BABB.

It has been shown that a urea concentration higher than 15% are associated with an increased risk of damaging a tissue, at least for some tissue types, while a concentration of less than 5% leads to severe tissue shrinkage after dehydration/BABB immersion. It can therefore be assumed that the ideal concentration of the chaotropic agent in the delipidation solution is between 5% and 15%.

Figure 10:
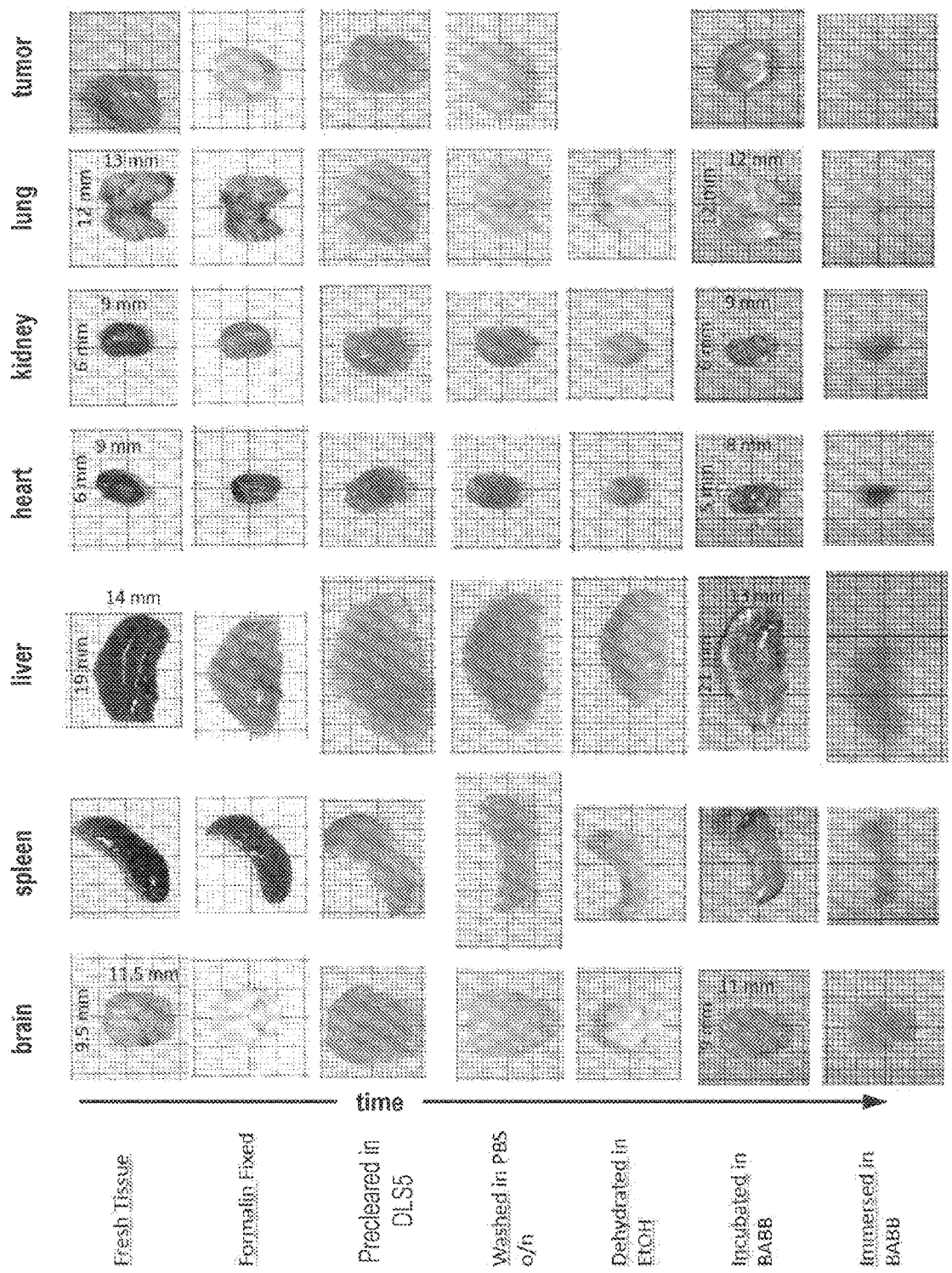
FIG. 10 shows photos of a plurality of tissue samples after each of a plurality of sample treatment and clearing steps.

FIG. 10 shows photos of a plurality of tissue samples after each of a plurality of sample treatment and clearing steps. The examined tissue samples are whole organ samples (brain, liver, heart, kidney and long) and a tumor tissue sample. The DLS5 is the delipidation solution described above with reference to FIG. 9 and comprises about 5% urea. The incubation times and temperature described above with reference to FIG. 9 were also used for processing the samples depicted in FIG. 10. As can be inferred from a comparison of the images of the tissue samples in the second (before incubation in DLS5) and third (after incubation in DLS5), a first clearing effect is already obtained by immersing the sample in the DLS5 solution. A second, stronger clearing effect is obtained by incubating the sample in an organic clearing solution BABB. The immersion of the samples both in DLS5 and in BABB provide for a particularly high clearing effect and at the same time for a particularly low morphological distortion of the sample.

In the table below, a comparison of the sizes of the fresh and BABB treated tissue samples depicted in FIG. 10 are provided:

|  | Projection area*, fresh | Projection area*, after BABB | % of original size |
|---|---|---|---|
| Brain | 109 | 99 | 91 |
| Liver | 266 | 273 | 103 |
| Heart | 54 | 40 | 74 |
| Kidney | 156 | 144 | 92 |
| Lung | 156 | 144 | 92 |
| Tumor | 125 | 95 | 76 |

*Due to strong bending of some organs like the spleen, the projected area was determined as lateral size in width and length of the respective tissue.

Typically, immersing a tissue sample in BABB results in a tissue shrinkage of about 30% to 50% of the original volume of the tissue sample. The table shows that immersing the sample in a delipidation solution comprising about 5% urea before immersing the sample in the BABB solution is able to protect the tissue sample from most of the tissue types examined from BABB-induced shrinkage. The effect was particularly prominent in liver, brain, kidney and lung tissue, but also observable in heart and tumor tissue. Preferably, tissue types which are particularly solid, e.g. heart and tumor tissue, are immersed in a delipidation solutions comprising the chaotropic agent in an amount of more than 5%, e.g. 10-15% of their volume to counteract the BABB-induced shrinkage.

LIST OF REFERENCE NUMERALS

100 method
102-116 steps
202 $1^{st}$ fixation solution
204 delipidation solution
206 staining solution(s)
208 $2^{nd}$ fixation solution
210 organic dehydration solution (ethanol)
211 sample transport system
212 organic clearing solution
213 pump(s)
214-222 kits
301 tissue sample
301' prepared and cleared tissue sample
302 sample preparation system
304 sample analysis system, e.g. microscope
306 sample loading unit
308 first fixation unit
310 sample immersion unit
312 photo-bleaching unit
314 staining unit
316 $2^{nd}$ fixation unit
318 dehydration unit
320 clearing unit
322 sample unloading unit
354 sample immersion unit
502 image of light-sheet traversing a tissue sample
802 table
803 brain tissue samples
806 96 well plate
808 bar plot

The invention claimed is:

1. A method of preparing a biological tissue sample for optical analysis such that a deviation of a volume, a morphology, or both a volume and a morphology of a prepared sample from a volume or a morphology of an original tissue is reduced, the method comprising:
   a) fixing the tissue sample with a first fixation solution;
   b) immersing the fixed tissue sample in a delipidation solution, the delipidation solution including,
      a chaotropic agent configured to induce a swelling of the sample;
   d) staining the tissue sample with one or more staining solutions;
   f) dehydrating the stained tissue sample in an organic dehydration solution, the dehydration solution configured to induce a shrinking of the sample; and
   g) immersing the fixed tissue sample in an organic clearing solution, wherein the delipidation solution is a water-based clearing solution.

2. The method of claim 1, further comprising:
   c) illuminating the sample with light of a wave length range comprising emission, excitation, or both emission and excitation wave lengths of the stain in order to selectively remove or reduce autofluorescence of the sample in said wave length range.

3. The method of claim 1, further comprising:
   e) fixing the stained tissue sample with a second fixation solution before the washing and dehydration is performed.

4. The method of claim 1, wherein a composition of the delipidation solution is chosen such that the tissue shrinkage induced by the organic dehydration solution is compensated in advance by the swelling induced by the delipidation solution.

5. The method of claim 1,
wherein the chaotropic agent is configured to cause a swelling of the volume of the sample by at least 15% of the volume of the original sample, or by at least 20% of the volume of the original sample; or
wherein a composition of the delipidation solution is chosen such that a combined effect of the swelling induced by the delipidation solution and of the shrinking induced by the dehydration solution provides a cleared tissue sample that deviates from the volume of the original, untreated tissue sample by less than 15%.

6. The method of claim 1, the chaotropic agent being a non-ionic chaotropic agent, urea or thio-urea, or an ionic chaotropic agent guanidinium including a guanidinium salt.

7. The method of claim 1, wherein the delipidation solution comprises 5-30%, 10-25%, 15-25%, or 20-25% by volume an amino alcohol including N,N,N',N', tetrakis (2-hydroxypropyl)ethyl-enediamine.

8. The method of claim 1, wherein the fixing of the tissue in the first fixation solution, the immersing of the fixed tissue sample in the delipidation solution, the staining, dehydrating and the immersing of the fixed tissue sample in the organic clearing solution are performed in an automated or a semi-automated process, the automated or the semi-automated process being free of a perfusion.

9. The method of claim 1, wherein
the organic clearing solution is a mixture of benzyl alcohol and benzyl benzoate (BABB), and
the method further comprises:
preparing the organic clearing solution, the preparing comprising choosing a ratio of benzyl alcohol and benzyl benzoate such that a refractive index of the organic clearing solution is identical to a refractive index of the tissue type of the sample.

10. The method of claim 1, wherein the sample has a volume of at least 0.5 cm$^3$, of at least 0.75 cm$^3$, or of at least 1 cm$^3$.

11. The method of claim 1, wherein the sample comprises a reporter protein or a stained biomarker, drug or metabolite already before the sample is fixed with the first fixation solution.

12. The method of claim 1, further comprising:
generating a 3D plot of stained sub-structures of the cleared tissue sample using a light-sheet fluorescence microscope.

13. An automated or semi-automated system for preparing a biological tissue sample for optical analysis, the system being configured for:
receiving a fixed tissue sample, the fixed tissue sample having been fixed with a first fixation solution;
immersing the fixed tissue sample in a delipidation solution, the delipidation solution comprising a chaotropic agent configured to induce a swelling of the sample;
staining the tissue sample with one or more staining solutions;
washing and dehydrating the stained tissue sample in an organic dehydration solution, the dehydration solution configured to induce a shrinking of the sample; and
immersing the fixed tissue sample in an organic clearing solution, wherein the delipidation solution is a water-based clearing solution.

14. The automated or semi-automated system of claim 13, wherein
the system comprises a reagent container for each one of a plurality of solutions comprising a delipidation solution, one or more staining solutions, a second fixation solution, an organic dehydration solution and an organic clearing solution;
the system comprises a sample transport means and a plurality of sample containers respectively being coupled to one of the reagent containers, the system being configured to coordinate the sample transport semi-automatically or fully automatically such that the sample is immersed in each of the plurality of solutions at least once in accordance with claim 13; or
the system comprises one or more pumps respectively being coupled to one of the reagent containers and to a sample container, the system being configured to coordinate the pumps such that the sample is immersed in each of the plurality of solutions at least once in accordance with claim 13.

15. A kit for preparing one or more tissue samples comprising:
a water-based delipidation solution comprising:
5%-30% or 5%-15% by volume of at least one chaotropic agent;
5-30% by volume of at least one detergent; and
an organic clearing solution.

16. The kit of claim 15, wherein the chaotropic agent is a non-ionic chaotropic agent or guanidinium including a guanidinium salt.

17. The kit of claim 15, wherein the chaotropic agent is urea or thio-urea.

18. The kit of claim 15, wherein the delipidation solution further comprises 5-30%, 10-25%, 15-25%, or 20-25% by volume of an amino alcohol, the amino alcohol including N,N,N',N', tetrakis(2-hydroxypropyl)ethylenediamine.

19. The kit of claim 15, wherein the at least one detergent is a combination of at least two different detergents, the combination including triethanol amin (TEA) and Tween-80.

20. The method of claim 5, wherein the delipidation solution comprises 5%-30% by volume of at least one chaotropic agent.

* * * * *